United States Patent
Sugimoto et al.

(10) Patent No.: US 9,606,403 B2
(45) Date of Patent: Mar. 28, 2017

(54) LIQUID CRYSTAL DISPLAY DEVICE COMPRISING SEGMENTED ELECTRODES AND SEGMENTED LIQUID CRYSTAL ORIENTATIONS AND METHOD FOR PRODUCING THE SAME

(71) Applicant: NLT Technologies, Ltd., Kawasaki (JP)

(72) Inventors: Mitsuhiro Sugimoto, Kanagawa (JP); Ken Sumiyoshi, Kanagawa (JP); Shinichi Nishida, Kanagawa (JP); Hidenori Ikeno, Kanagawa (JP); Hideki Ito, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 168 days.

(21) Appl. No.: 14/437,368

(22) PCT Filed: Oct. 22, 2012

(86) PCT No.: PCT/JP2012/077241
§ 371 (c)(1),
(2) Date: Apr. 21, 2015

(87) PCT Pub. No.: WO2014/064751
PCT Pub. Date: May 1, 2014

(65) Prior Publication Data
US 2015/0286105 A1    Oct. 8, 2015

(51) Int. Cl.
*G02F 1/1337*    (2006.01)
*G02F 1/1343*    (2006.01)

(52) U.S. Cl.
CPC .... *G02F 1/134363* (2013.01); *G02F 1/13439* (2013.01); *G02F 1/133707* (2013.01);
(Continued)

(58) Field of Classification Search
CPC ... G02F 2001/134372; G02F 1/133753; G02F 2001/133757
See application file for complete search history.

(56) References Cited

U.S. PATENT DOCUMENTS

2003/0081163 A1    5/2003   Suzuki et al.
2007/0030429 A1*   2/2007   Kim .................. G02F 1/133753
                                                          349/129
(Continued)

FOREIGN PATENT DOCUMENTS

CN    1181517 A      5/1998
CN    101290410 A    10/2008
(Continued)

OTHER PUBLICATIONS

International Search Report for PCT/JP2012/077241 dated Jan. 8, 2013.
(Continued)

*Primary Examiner* — Paul Lee
(74) *Attorney, Agent, or Firm* — Sughrue Mion, PLLC

(57) ABSTRACT

Provided is a liquid crystal display device and a method for producing the same, wherein one electrode is composed of four segmented electrodes (P1, P2, P3, P4) and has segmented orientations (O1, O2, O3, O4), and the segmented electrode (p4) has the same structure as that of segmented electrodes (P'4) of adjacent pixels (at three positions of right, below, and lower right). An area surrounding four segmented electrodes (P4 (P'4)) that are present in adjacent four pixels having the same structure is processed with the same segmented orientation (O4). With this configuration, excellent viewing angle properties are maintained even with high-definition pixels, and efficient processing with segmented orientations can be performed.

14 Claims, 30 Drawing Sheets

(52) U.S. Cl.
CPC ............ *G02F 1/133753* (2013.01); *G02F 2001/133757* (2013.01); *G02F 2001/134345* (2013.01); *G02F 2001/134372* (2013.01)

(56) References Cited

U.S. PATENT DOCUMENTS

| | | | |
|---|---|---|---|
| 2008/0259256 | A1 | 10/2008 | Dong |
| 2009/0244462 | A1* | 10/2009 | Tsubata ............... G02F 1/1309 349/129 |
| 2009/0279034 | A1* | 11/2009 | Shoraku ............ G02F 1/133753 349/129 |
| 2012/0236238 | A1* | 9/2012 | Kim ..................... G02F 1/1337 349/123 |
| 2013/0278877 | A1* | 10/2013 | Kwon .............. G02F 1/133707 349/123 |

FOREIGN PATENT DOCUMENTS

| | | |
|---|---|---|
| CN | 102636895 A | 8/2012 |
| JP | 05-224210 A | 9/1993 |
| JP | 06-110060 A | 4/1994 |
| JP | 08-043826 A | 2/1996 |
| JP | 10-307295 A | 11/1998 |
| JP | 2001-305543 A | 10/2001 |
| JP | 2006-085204 A | 3/2006 |
| JP | 2008-268944 A | 11/2008 |
| JP | 2012-181501 A | 9/2012 |

OTHER PUBLICATIONS

Communication dated Dec. 6, 2016, from the State Intellectual Property Office of People's Republic of China in counterpart Application No. 201280076568.0.

\* cited by examiner

FIG. 28A

| R | G | B | R | G | B |
|---|---|---|---|---|---|
| R | G | B | R | G | B |
| R | G | B | R | G | B |

FIG. 28B

| R(A) | R(B) | G(A) | G(B) | B(A) | B(B) | R(A) | R(B) | G(A) | G(B) | B(A) | B(B) |
|------|------|------|------|------|------|------|------|------|------|------|------|
| R(A) | R(B) | G(A) | G(B) | B(A) | B(B) | R(A) | R(B) | G(A) | G(B) | B(A) | B(B) |
| R(A) | R(B) | G(A) | G(B) | B(A) | B(B) | R(A) | R(B) | G(A) | G(B) | B(A) | B(B) |

FIG. 28C

| R(A) | G(A) | B(A) | R(A) | G(A) | B(A) |
|------|------|------|------|------|------|
| R(B) | G(B) | B(B) | R(B) | G(B) | B(B) |
| R(A) | G(A) | B(A) | R(A) | G(A) | B(A) |
| R(B) | G(B) | B(B) | R(B) | G(B) | B(B) |
| R(A) | G(A) | B(A) | R(A) | G(A) | B(A) |
| R(B) | G(B) | B(B) | R(B) | G(B) | B(B) |

LIQUID CRYSTAL DISPLAY DEVICE COMPRISING SEGMENTED ELECTRODES AND SEGMENTED LIQUID CRYSTAL ORIENTATIONS AND METHOD FOR PRODUCING THE SAME

CROSS REFERENCE TO RELATED APPLICATIONS

This application is a National Stage of International Application No. PCT/JP2012/077241 filed Oct. 22, 2012, the contents of all of which are incorporated herein by reference in their entirety.

TECHNICAL FIELD

The present invention relates to a liquid crystal display device capable of performing efficient orientation segmenting processing while maintaining a fine viewing angle characteristic even with high-definition pixels, and to a method for producing the same.

BACKGROUND ART

Liquid crystal displays are characterized to be of high-display quality, thin, low power consumption, low cost, and the like, and are being spread rapidly for various usages. For example, the liquid crystal display devices are employed to various display products of small size such as monitors for mobile phones and monitors for digital still cameras, to various products of middle size such as monitors for notebook personal computers as well as desktop personal computers, monitors for graphic designs and monitors for medical use, and further to various products of large size such as liquid crystal television sets and digital signage monitors.

Recently, there is an increasing demand for improving the display quality of the liquid crystal display of high-end models and high-luminance image quality is being advanced by achieving high definition and high numerical aperture (high transmittance). Under such circumstances, it is desired to achieve a performance which can provide improvement in the uniformity on the display screens and a wide viewing angle property with high contrast and fine color regenerability.

To improve the uniformity of the display screen, it is necessary to uniformalize the orientation of the liquid crystal within the pixel. As a means for improving it, known is rubbingless orientation processing in which an energy beam is irradiated to an orientation film. There are ion beam orientation processing using He atoms and Ar atoms and photo-orientation processing by performing irradiation of UV (Ultra Violet) rays. Especially, the photo-orientation processing is a process that requires no vacuum processing, which is employed to VA (Vertical Alignment) type products and is being studied and developed to be applied to TN (Twisted Nematic), IPS (In-plane Switching) types, FFS (Fringe Field Switching) type, and the like.

The photo-orientation processing cuts the intermolecular coupling of the orientation film by a molecule level and changes the coordinate position of the molecules or couples those by a molecule level according to the incident direction of the irradiated light and the polarization direction thereof to provide effective anisotropy for the orientation of the liquid crystal molecules. Therefore, the orientation of the liquid crystal molecules can be controlled by a molecule level, so that the orientation uniformity is extremely high. Further, the photo-orientation processing does not face the issues such as bright points and dark points caused due to scars and striped orientation unevenness generated by rubbing of a rubbing cloth and foreign matters generated by shavings of a rubbing cloth which may be observed in the rubbing type processing. Therefore, it is particularly effective for achieving high definition. However, relatively high energy irradiation is required with the photo-orientation processing for giving the orientation property in the orientation film, so that it is desired to improve the process of light irradiation, to refine the pixel structure, and to improve the processing capacity by developing the orientation film materials, etc.

As the techniques for acquiring the wide viewing angle property, there are lateral electric field types such as an IPS type and an FFS type. In such types, nematic liquid crystal molecules aligned horizontally are rotated in the horizontal direction by a lateral electric field, with which changes in the image quality in the viewing angle directions caused by rise of the molecule axes can be suppressed so that the viewing angle property can be improved. Further, with the lateral electric field type, compensation can be done with the viewing angle properties of each electrode region through employing a segmented electrode type in which comb-like electrode shape within a pixel is operated by being segmented into two or four regions. This makes it possible to improve the squint colored change property and gradation inversion. Further, the same effect as that of such improvement can be acquired also with a segmented orientation method in which a same comb-like electrode region within a pixel is segmented to regions of different orientation directions. However, with the above-described segmented electrode method and the segmented orientation method, the liquid crystal orientation becomes discontinuous in the boundaries of the electrode regions or the orientation regions. Thereby, disclination lines are generated, which may deteriorates the contrast by light leakage in black display and may deteriorate the luminance by deterioration of the transmittance in white display since an electric field required for rotating the liquid crystal cannot be applied. As a countermeasure for that, it is effective to shield the light by devising the electrode structure, etc. However, it becomes difficult to be applied to high-definition pixels.

As disclosed in Patent Documents 1 to 5 (related techniques) below, the segmented orientation for the TN type is proposed earlier than that of the lateral electric type. FIG. 26, FIG. 27, FIG. 28, FIG. 29, and FIG. 30 below are quoted directly from each of Patent Documents. Thus, reference numerals applied in each of those drawings are effective only in each of the drawings, and are unrelated to the reference numerals of the other drawings.

FIG. 26 shows the technique depicted in Patent Document 1. Patent Document 1 discloses a technique related to a liquid crystal display device including nematic liquid crystal sandwiched between opposing two substrates where electrodes and liquid crystal orientation films are formed and a plurality of picture elements 6 are arranged in matrix, wherein: on each of the picture elements 6, viewing angles of a liquid molecule is segmented into mutually different regions 18, 19; a lower region on the picture element 6 of an arbitrary row and an upper region of the picture element 6 of a next row have a same viewing angle; and a lower region on the picture element 6 of an arbitrary column and an lower region of the picture element 6 of a next column have a same viewing angle. Thereby, the orientation segmented state is stably maintained, so that the contrast unevenness by the viewing angle directions and the contrast unevenness by a pressure can be prevented. In FIG. 26, gate electrodes 13, source electrodes 17, and an active matrix substrate 20 are illustrated.

FIG. 27 shows the technique depicted in Patent Document 2. Patent Document 2 discloses a technique related to a liquid crystal display element including a liquid crystal layer sandwiched between two substrates with surfaces where electrodes are disposed are opposed to each other and a plurality of pixels a are formed and including two regions A and B of different molecule orientation states within a pixel for each pixel, wherein: between neighboring pixels, one of the regions of an arbitrary pixel and a region of another pixel neighboring thereto are arranged to be regions of a same molecule orientation. Thereby, the number of disclination lines generated when the pixel is segmented into the two regions of different orientations is decreased, so that the liquid crystal display element of high quality display can be acquired. In FIG. 27, pixel electrodes 21 and TFT driving elements 22 are illustrated.

FIG. 28 shows the technique depicted in Patent Document 3. Patent Document 3 discloses a technique with which: a twisted nematic layer on a single pixel is segmented into two regions A and B whose orientation directions are different by 180 degrees for widening the viewing angle range; and further light leakage from the boundary of the twisted nematic layers at the time of normally white black display is prevented by using a light-shielding film to achieve high contrast. This makes it possible to suppress deterioration in the contrast of the liquid crystal display device which includes twisted nematic liquid crystal of different orientation directions within a pixel. FIG. 28($a$) shows a typical plan layout of color filters R, G, and B, while FIGS. 28($b$) and 28($c$) show examples where the technique depicted in Patent Document 3 is employed to FIG. 28A and sections 25 shown with wavy lines indicate that one pixel is segmented.

FIG. 29 shows the technique depicted in Patent Document 4. Patent Document 4 discloses a technique for providing a liquid crystal display device which is excellent in the viewing angle property and capable of achieving high-quality display. A picture element includes four-segmented domains D in which first, second, third, and fourth domains (D1 to D4) having mutually different orientation directions of liquid crystal molecules located in the vicinity of the center of the thickness direction of a liquid crystal layer 30 are arranged in this order along a certain direction. A first substrate 10 includes: two first regions A1 exhibiting a restriction force for aligning liquid crystal molecules in a first direction R1; and a second region A2 exhibiting a restriction force for aligning the molecules in a second direction R2 opposite from the first direction R1, which is provided between the two first regions A1. A second substrate 20 includes: a third region A3 exhibiting a restriction force for aligning the molecules in a third direction R3 crossing with the first direction R1; and a fourth region A4 exhibiting a restriction force for aligning the molecules in a fourth direction R4 opposite from the third direction R3. The boundaries between each of the domains (D1 to D4) are extended in a direction that is orthogonal to the orientation direction of each of the domains (D1 to D4). Note that x, y, and p in FIG. 29 show the lengths.

FIG. 30 shows the technique depicted in Patent Document 5. Patent Document 5 discloses a technique which improves the viewing angle dependency of displayed images even when line segments of any directions, monochrome regions, or characters are displayed on a liquid crystal display device. Included therein are: an orientation film 10 in which a first unit orientation region 6 having a first orientation property and a second unit orientation region 8 having a second orientation property different from the first orientation property are disposed in a mixed manner at line and column positions of a matrix; and an orientation film 10 in which the first and second unit orientation regions 6, 8 are disposed in a mixed manner along the straight lines in all directions. This means that a mask suited for forming a plurality of kinds of orientation regions having different orientation properties on the orientation film 10 is used. In FIG. 30, illustrated are orientation regions 12 constituted with the unit orientation regions 6, orientation regions 14 constituted with the unit orientation regions 8, and reference patterns 16 constituted with the orientation regions 12, 14.

Patent Document 1: Japanese Unexamined Patent Publication Hei 08-043826

Patent Document 2: Japanese Unexamined Patent Publication Hei 06-110060

Patent Document 3: Japanese Unexamined Patent Publication Hei 05-224210

Patent Document 4: Japanese Unexamined Patent Publication 2006-085204

Patent Document 5: Japanese Unexamined Patent Publication 2001-305543

However, there are following issues with the related techniques described above.

The first issue is that high-definition of the pixels and the wide viewing angle property cannot be achieved together with the segmented orientation method done by the photo-orientation processing. As the segmented orientation, four-segmented orientation with which the symmetry of the orientation directions of the liquid crystal can be provided is particularly effective in order to improve the viewing angle properties of not only the top and bottom as well as left and right view fields but also the oblique view field. In the meantime, the liquid crystal orientation becomes discontinuous in the boundary areas of the segmented orientation and disclination is generated, so that it cannot be considered as the region effective for display. The area ratio of the region where disclination is generated is increased with respect to the pixel region as the segment number of the segmented orientation is increased or with the higher definition (as the pixel size becomes smaller), which results in deterioration of the display quality and substantial decrease in the numerical aperture.

The second issue of the segmented orientation method done by the photo-orientation processing is that the photo-orientation processing is not effective for achieving high-definition of the pixels and the wide viewing angle property. In order to improve the viewing angle properties of not only the top and bottom as well as left and right view fields but also the oblique view field, four-segmented orientation capable of providing symmetry of the orientation directions of the liquid crystal is particularly effective. The mainstream of a photo-orientation processing method of the segmented orientation is a method which segments a work substrate into a plurality of UV irradiation areas and executes mask exposure on the segmented regions by step feed, and employed is proximity exposure which takes a gap in the order of about several μm to several tens of μm between the mask and the work substrate. In the segmented orientation, in addition to the fact that the region of one orientation direction becomes small, the region becomes still smaller for achieving high definition. Further, spread of the light of the proximity exposure and alignment precision are the issues. Therefore, it is advantageous to set the light irradiation area of the segmented orientation to be large as much as possible. This point is not mentioned in any of Patent Documents.

The third issue is deterioration of the display quality. As disclosed in Patent Documents 1, 2, and 4, in the segmented orientation, same orientation processing is performed on the areas covering over the pixels. However, the orientation processing is executed in the layout that is continuous only in one direction. Thus, display unevenness on the boundaries of the orientation processed sections is visually recognized continuously, thereby deteriorating the display quality. In order to overcome the display unevenness on the boundaries of the orientation processed sections visually recognized continuously, the technique disclosed in Patent Document 5 provides a mask unit in which a plurality of pixel patterns where orientation states vary by a pixel unit or a sub-pixel unit are combined, and executes the orientation processing by that mask unit. However, even though the case of Patent Document 5 is effective for the display unevenness caused due to the continuous orientation processing boundaries, the mask pattern thereof becomes extremely complicated and it is necessary to prepare the mask for each orientation processing pattern. Therefore, efficient orientation processing cannot be performed.

Further, none of Patent Documents discloses a technique for periodically changing a combination of the segmented electrode layout and segmented orientation layout within a pixel at all, so that efficient orientation processing cannot be performed with those.

It is therefore an object of the present invention to provide a liquid crystal display device and a manufacturing method thereof, with which a finer viewing angle property can be maintained even with high-definition pixels and efficient orientation segmenting processing can be performed.

DISCLOSURE OF THE INVENTION

A liquid crystal display device according to the present invention includes pixels arranged in matrix with an electrode pattern and a liquid crystal orientation region of a single pixel region being segmented and disposed, respectively, wherein: the single pixel region is a mutually corresponding combination of the electrode pattern segmented into a plurality of segmented electrodes Pn (constituted with P1, P2, . . . , Pm, where m is an integer of 2 or larger) and a liquid crystal orientation segmented into a plurality of segmented orientations On (O1, O2, . . . , Om, where m is an integer of 2 or larger); the segmented electrode Pn (n is an arbitrary integer of 1 to m, and m is an integer of 2 or larger) of the single pixel region and segmented electrode P'n (n is an arbitrary integer of 1 to m, and m is an integer of 2 or larger) of a pixel region adjacent thereto are in a same structure; and the segmented orientation On (n is an arbitrary integer of 1 to m, and m is an integer of 2 or larger) of the single pixel region and segmented orientation O'n (n is an arbitrary integer of 1 to m, and m is an integer of 2 or larger) of at least one pixel adjacent thereto are formed with a same orientation region.

A liquid crystal display device producing method according to the present invention is a method for producing the liquid crystal display device which includes pixels arranged in matrix with an electrode pattern and a liquid crystal orientation region of a single pixel region being segmented and disposed, respectively, wherein: the single pixel region is a mutually corresponding combination of the electrode pattern segmented into a plurality of segmented electrodes Pn (constituted with P1, P2, . . . , Pm, where m is an integer of 2 or larger) and the liquid crystal orientation segmented into a plurality of segmented orientations On (O1, O2, . . . , Om, where m is an integer of 2 or larger); the segmented electrode Pn (n is an arbitrary integer of 1 to m, and m is an integer of 2 or larger) of the single pixel region and a segmented electrode P'n (n is an arbitrary integer of 1 to m, and m is an integer of 2 or larger) of a pixel region adjacent thereto are in a same structure; the segmented orientation On (n is an arbitrary integer of 1 to m, and m is an integer of 2 or larger) of the single pixel region and a segmented orientation O'n of at least one pixel adjacent thereto are formed with a same orientation region; a segmented orientation region On+O'n formed with the segmented orientation On of the single pixel region and the segmented orientation O'n of the pixel region adjacent thereto is formed with a repeated pattern of a same shape and a same area, respectively; and the segmented orientation region On+O'n (n is an arbitrary integer of 1 to m, and m is an integer of 2 or larger) is formed by photo-orientation processing in which an arbitrary mask size is taken as an exposure area and step feed is performed in a direction corresponding to an orientation direction of each region of the orientation segment.

The present invention discloses a wide orientation pattern that covers the neighboring pixel regions when segmenting the orientation within a pixel by photo-orientation processing, so that it is possible to provide a liquid crystal display device and a manufacturing method thereof, with which a finer viewing angle property can be maintained even with high-definition pixels and efficient orientation segment processing can be performed.

BRIEF DESCRIPTION OF THE DRAWINGS

FIG. 28 is a view showing a technique depicted in Patent Document 3;

BEST MODES FOR CARRYING OUT THE INVENTION

Figure 1:
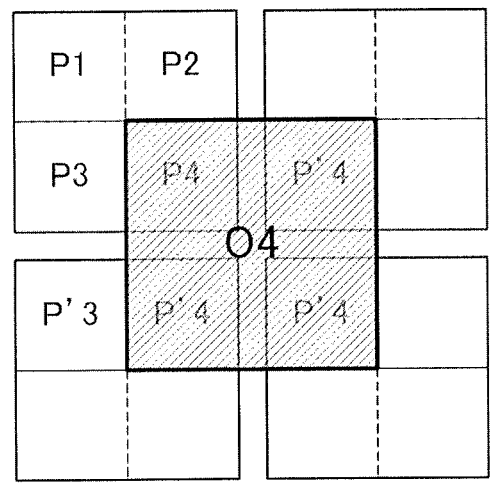
FIG. 1 is a schematic view showing an example of a structure of a first embodiment in which segmented electrodes and segmented orientations are combined.

Hereinafter, modes for embodying the present invention (referred to as "embodiments" hereinafter) will be described by referring to the accompanying drawings. In the descriptions below, same reference numerals are used for the substantially same structural elements. The shapes in the drawings are illustrated to be easily comprehended by those skilled in the art, so that sizes and ratios thereof are not necessarily consistent with the actual ones.

First Embodiment

FIG. 1 is a schematic view showing an example of a structure of a first embodiment in which segmented electrodes and segmented orientations are combined. A liquid crystal display device according to the first embodiment is structured by a layout relation of segmented electrodes (P1, P2, P3, P4) segmented into four as shown in FIG. 1[A] and segmented orientations (O1, O2, O3, O4) segmented into four as shown in FIG. 1[B]. Further, FIG. 1[C] shows a positional relation between the segmented electrodes and the segmented orientations. In the drawing, four neighboring pixels are shown, and one pixel is constituted with the four segmented electrodes (P1, P2, P3, P4). Further, when a given segmented electrode of a given pixel is adjacent to a segmented electrode of another pixel, those segmented electrodes are in a same structure. In the case of the drawing, the segmented electrode P4 is in a same structure as that of the segmented electrodes P'4 of the neighboring three pixels (three positions on the right, below, and lower right). Furthermore, the area surrounding the four segmented electrodes P4 (P'4) of the same structure within the neighboring four pixels is processed with the same segmented orientation (O4).

In other words, the liquid crystal display device according to the first embodiment is in a structure which includes the segmented electrodes (P1, P2, P3, P4) segmented into four and the segmented orientations (O1, O2, O3, O4) segmented into four. For example, the segmented electrode P4 is in a same structure as that of the as that of the segmented electrodes P'4 of the neighboring three pixels (three positions on the right, below, and lower right). The area surrounding the four segmented electrodes P4 (P'4) of the same structure within the neighboring four pixels is processed with the same segmented orientation (O4).

FIG. 2 to FIG. 6 are plan views which specifically show combinations of the segmented electrodes and the segmented orientations within a pixel based on the above-described content. Shown as a way of examples are the FFS type as the segmented electrodes, and the orientation direction and tilt angle (pre-tilt angle) of the liquid crystal aligned homogeneously and, further, a polarization axis 11a of a TFT substrate as well as a polarization axis 12a of a CF substrate as the segmented orientations. While the shown in the first embodiment is the FFS type, the present invention is preferable for lateral electric field type devices such as an IPS type and a combination of the FFS type and the IPS type. Further, the present invention can be applied to the other types as well.

Figure 2:
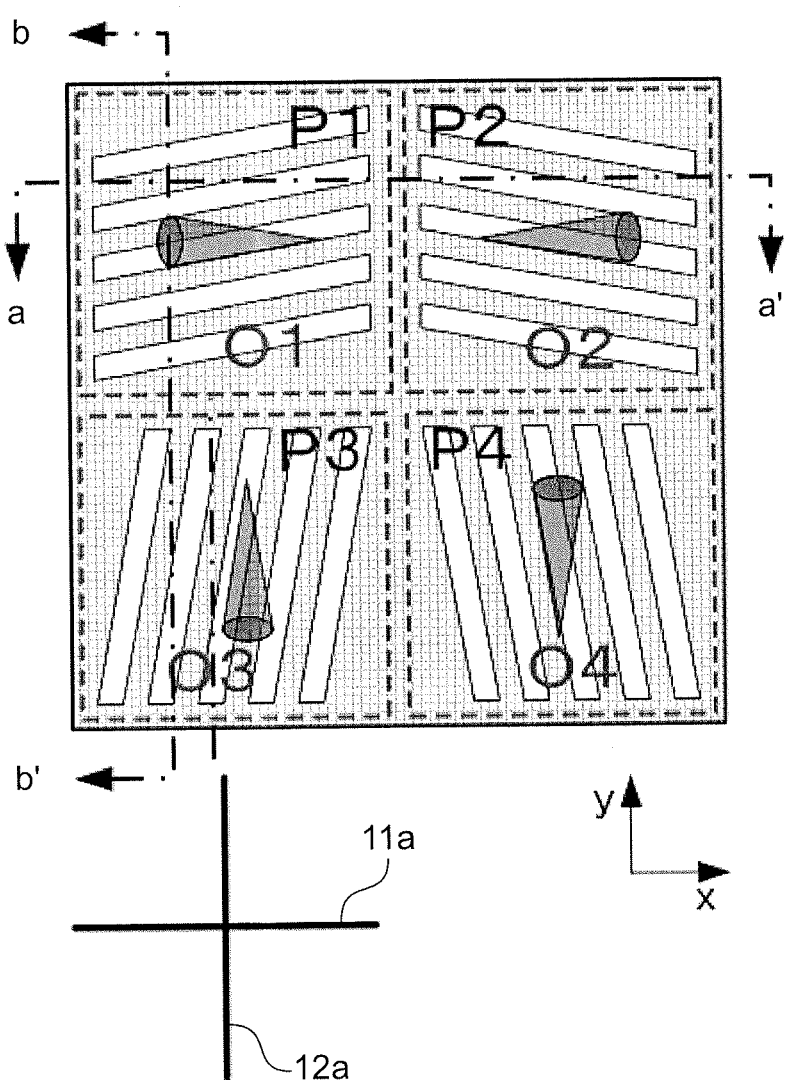
FIG. 2 is a plan view (1) which specifically shows a combination of segmented electrodes and segmented orientations within a pixel according to the first embodiment.
Figure 3:
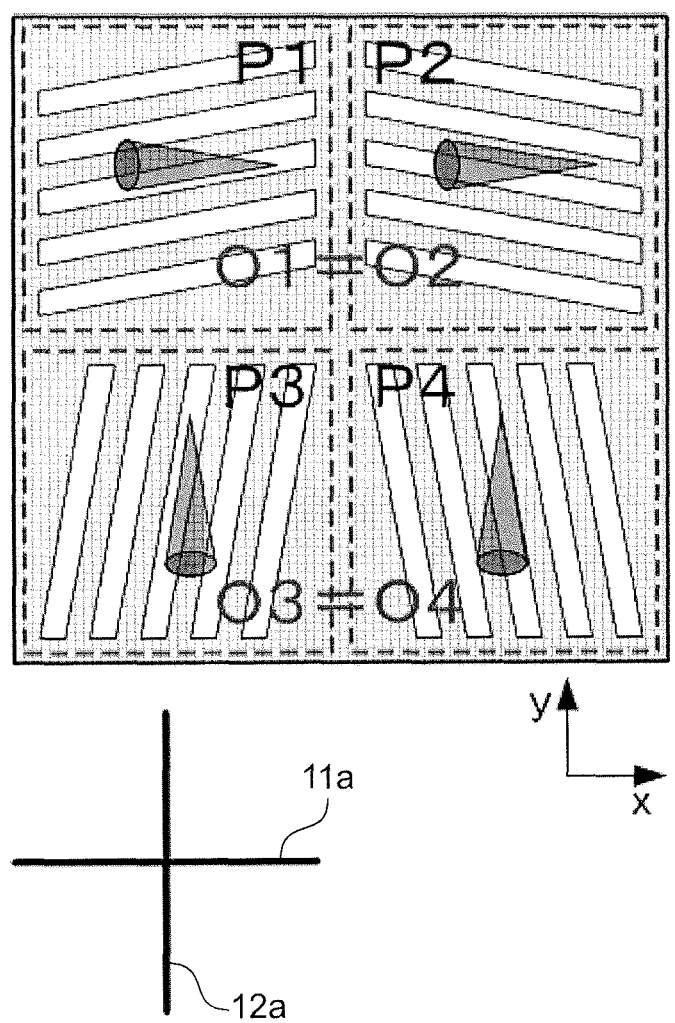
FIG. 3 is a plan view (2) which specifically shows a combination of segmented electrodes and segmented orientations within a pixel according to the first embodiment.
Figure 4:
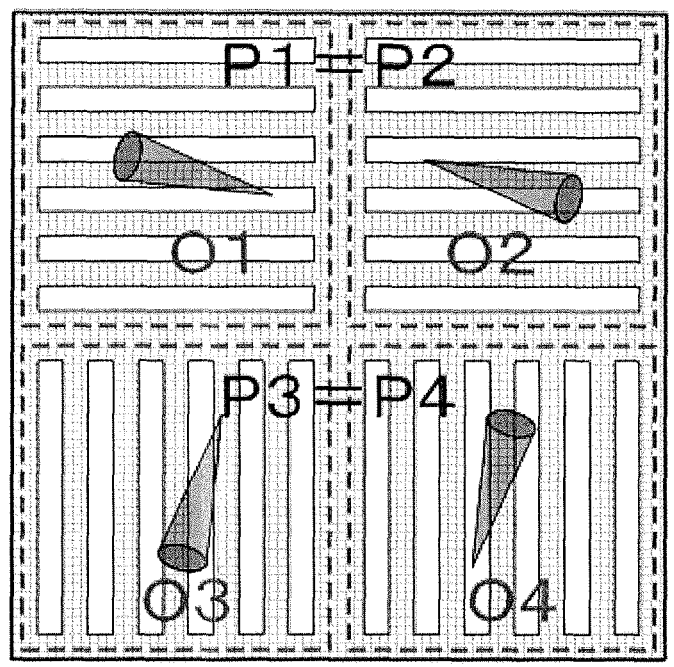
FIG. 4 is a plan view (3) which specifically shows a combination of segmented electrodes and segmented orientations within a pixel according to the first embodiment.
Figure 5:
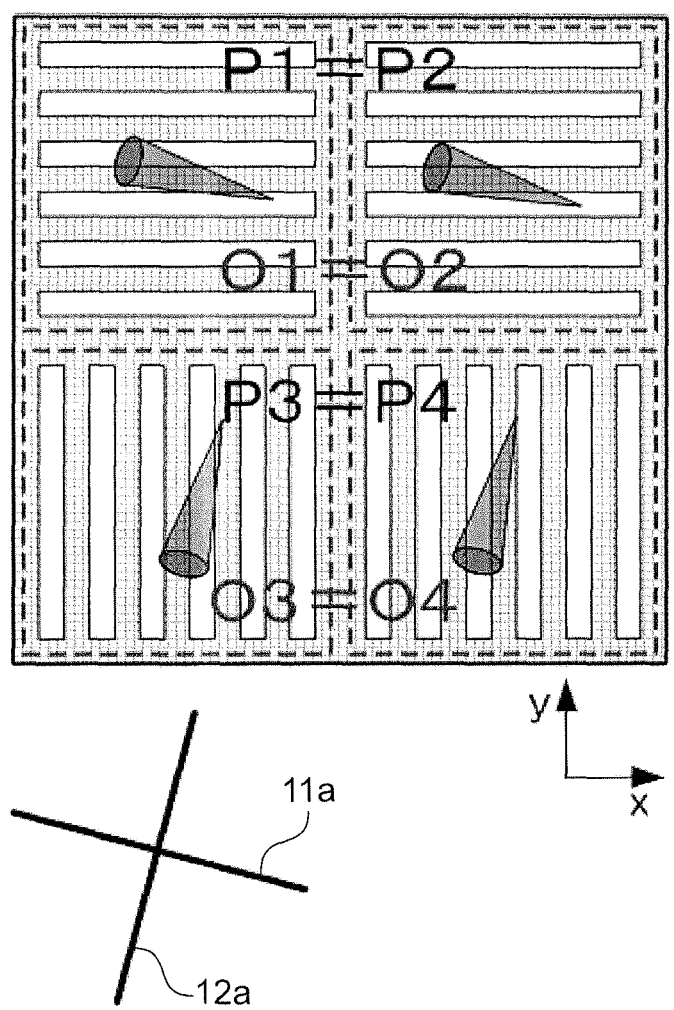
FIG. 5 is a plan view (4) which specifically shows a combination of segmented electrodes and segmented orientations within a pixel according to the first embodiment.
Figure 6:
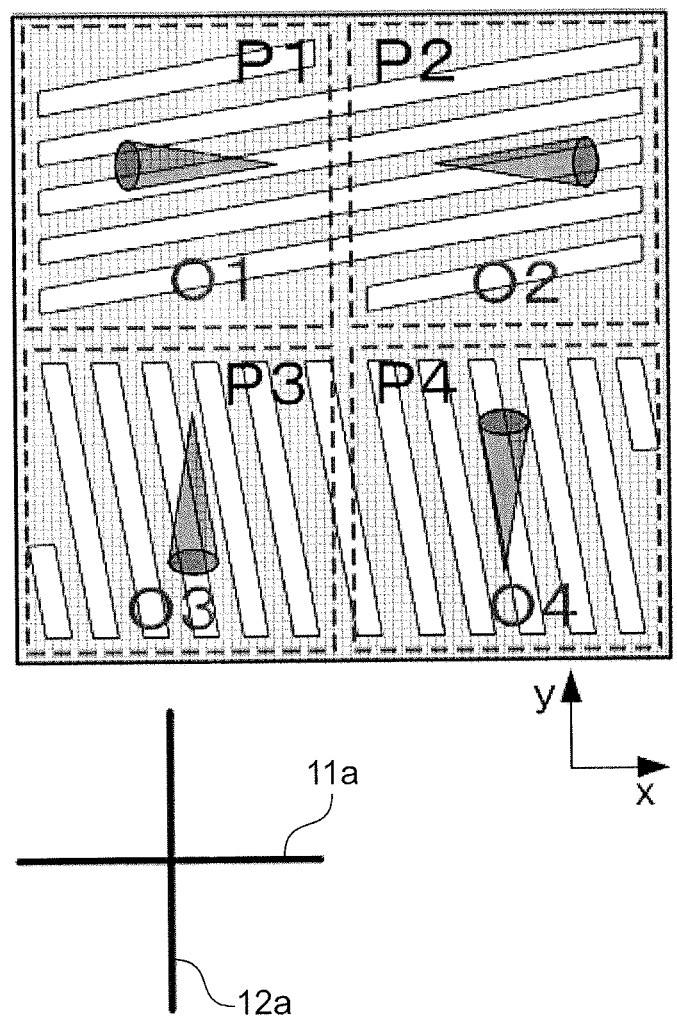
FIG. 6 is a plan view (5) which specifically shows a combination of segmented electrodes and segmented orientations within a pixel according to the first embodiment.

In FIG. 2 and FIG. 6, the four segmented electrodes (P1, P2, P3, P4) are different from each other, and the four segmented orientations (O1, O2, O3, O4) are different from each other as well. In FIGS. 3, O1 and O2 are the same orientations (O1=O2), and O3 and O4 are the same orientations (O3=O4) among the four segmented orientations (O1, O2, O3, O4). In FIGS. 4, P1 and P2 are the same electrode structures (P1=P2), and P3 and P4 are the same electrode structures (P3=P4) among the four segmented electrodes (P1, P2, P3, P4). In FIGS. 5, P1 and P2 are the same electrode structures (P1=P2), P3 and P4 are the same electrode structures (P3=P4) among the four segmented electrodes (P1, P2, P3, P4), O1 and O2 are the same orientations (O1=O2), and O3 and O4 are also the same orientations (O3=O4) among the four segmented orientations (O1, O2, O3, O4).

Figure 7A:
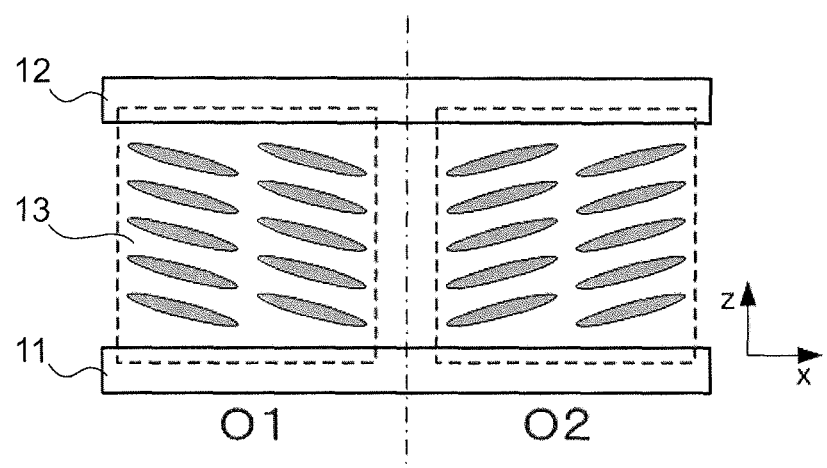
FIG. 7 is a sectional view (1) which specifically shows a combination of segmented electrodes and segmented orientations within a pixel according to the first embodiment.
Figure 7B:
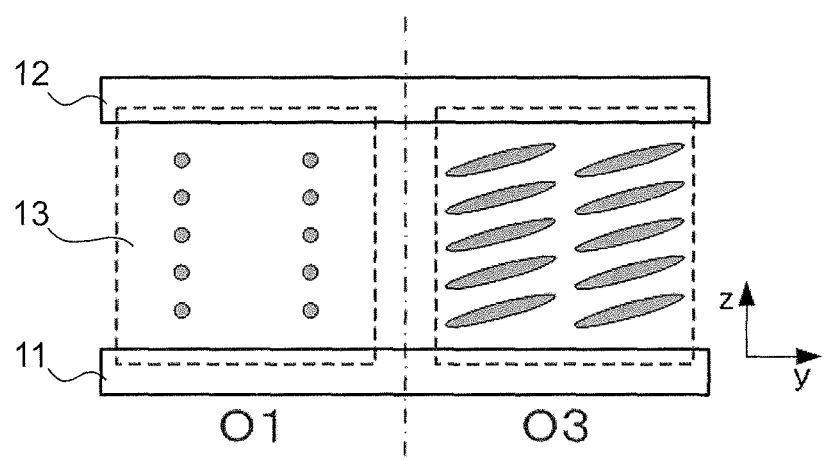
Figure 8A:
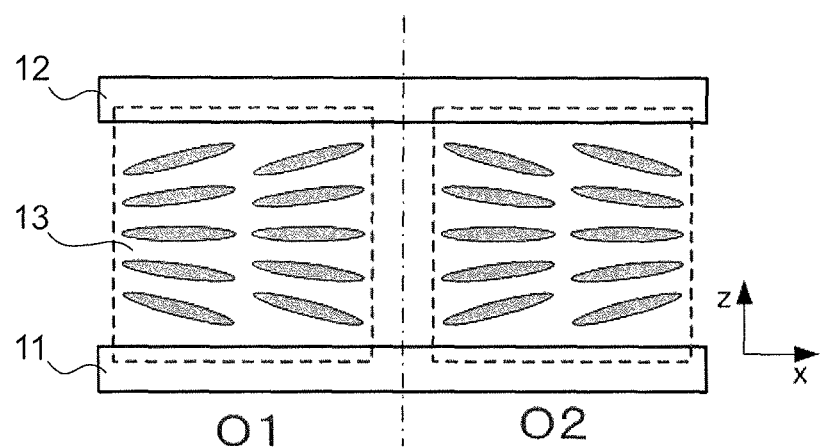
FIG. 8 is a sectional view (2) which specifically shows a combination of segmented electrodes and segmented orientations within a pixel according to the first embodiment.
Figure 8B:
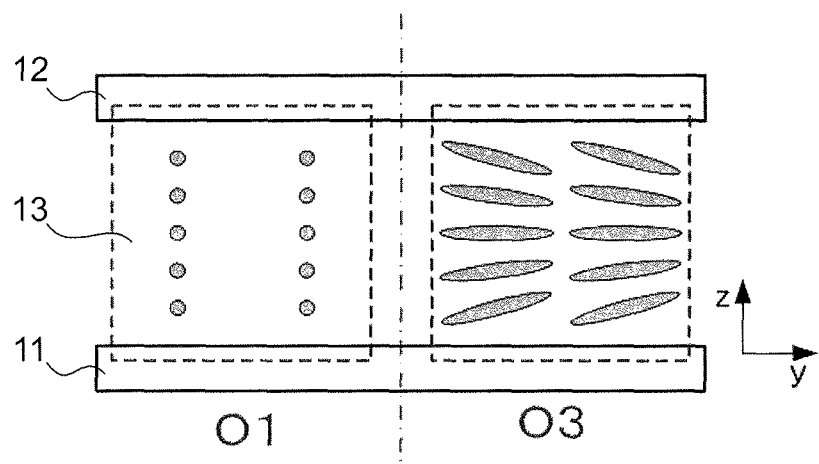
Figure 9A:
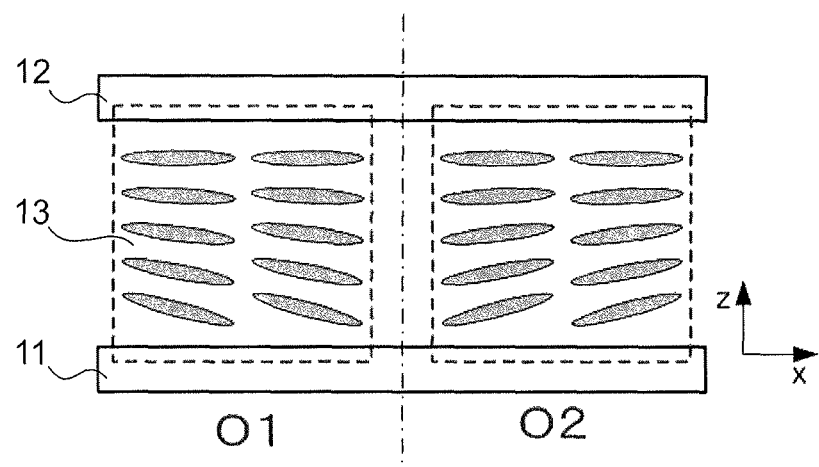
FIG. 9 is a sectional view (3) which specifically shows a combination of segmented electrodes and segmented orientations within a pixel according to the first embodiment.
Figure 9B:
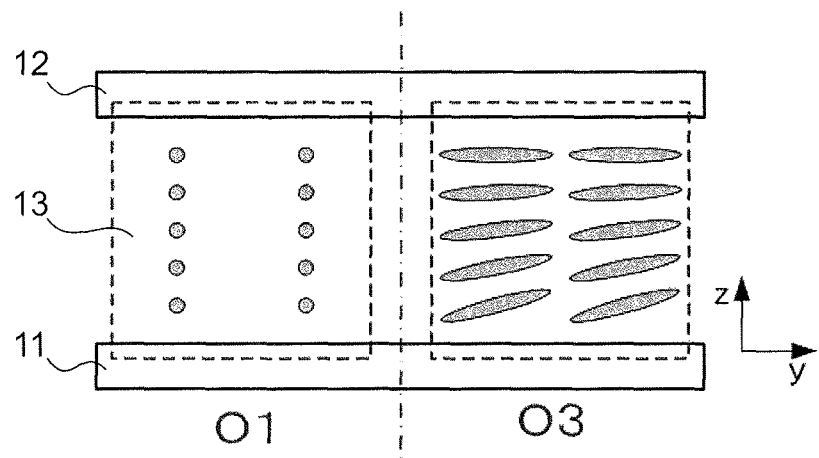

FIG. 7 to FIG. 9 are views which show the orientation state of the liquid crystal molecules in the sectional direction based on the plan view of FIG. 2 among the combinations of the segmented electrodes and the segmented orientations within a pixel described above. A liquid crystal layer 13 is sandwiched between a TFT (Thin Film Transistor) substrate 11 that is a substrate where segmented electrodes are formed and a CF (Color Filter) substrate 12 that is a substrate opposing to the TFT substrate 11. Regarding the state of the segmented orientations, the liquid crystal orientation in the sectional-view direction (thickness direction) is determined according to the liquid crystal orientation in the interface between the TFT substrate 11 and the liquid crystal layer 13 and the liquid crystal orientation in the interface between the CF substrate 12 side and the liquid crystal layer 13. Regarding the liquid crystal orientations of a-a' section (FIG. 7[A], FIG. 8[A], and FIG. 9[A]) and b-b' section (FIG. 7[B], FIG. 8[B], and FIG. 9[B]) in FIG. 2, the three states can be provided by selecting the orientation processing directions of the TFT substrate 11 and the CF substrate 12.

FIG. 7 shows a state of anti-parallel orientation in which the orientation directions of the TFT substrate 11 side and the CF substrate 12 side are changed by 180 degrees. FIG. 8 shows a state of splay orientation in which the orientation directions are set to be the same on the TFT substrate 11 side and the CF substrate 12 side. In FIG. 9, the orientation direction on the CF substrate 12 side is fixed to 0 degrees or 180 degrees while the orientation within a pixel on the TFT substrate 11 side is segmented to 0 degrees and 180 degrees.

Note that the above-described segmented orientations (O1, O2, O3, O4) show the directions of average liquid crystal orientations in the sectional direction and do not specifically limit the types (anti-parallel, splay, or mixture of the both) of the liquid crystal orientations in the sectional-view direction. To control the liquid crystal orientations in the sectional direction arbitrarily, it is necessary to have a pre-tilt angle of the liquid crystal molecules in the orientation film interface. As a method thereof, UV light of non-polarization light or straight polarization light is irradiated into the orientation film so as to generate three-dimensional optical anisotropy including not only the X-Y plane direction of the orientation film but also the thickness direction (Z-direction). Thereby, it is possible to control an arbitrary pre-tilt angle.

Further, regarding the segmented orientations (O1, O2, O3, O4), even when the directions of the average liquid crystal orientation are the same in a state where no voltage is applied, the directions of the liquid crystal orientations after a voltage is applied can be made substantially different through changing the twisted degrees of the liquid crystal molecules in a bulk and the directions thereof by a combination with the segmented electrodes. In such case, the pre-tilt angle of the liquid crystal molecules may be set as 0. In that case, UV light of the straight polarization light may be irradiated from the perpendicular direction so as to generate the two-dimensional optical anisotropy in the X-Y plane direction of the orientation film.

As described above, there are some alternatives in the segmented orientations, which can be arbitrarily selected by considering the viewing angle property, suppression of disclination between the segmented orientations, the mass-productivity regarding the orientation processing of each substrate, etc. Further, in the lateral electric filed mode, the orientation processing on the TFT substrate side that has the segmented electrodes is important. A large electric field is applied to the liquid crystal molecules in the vicinity of the segmented electrode side at the time of driving the panel, so that a stable and tough anchor ring is necessary between the liquid crystal on the substrate interface and the orientation film. Thus, regarding the segmented orientations (O1, O2, O3, O4), the orientation processing on the substrate side having the segmented electrodes is most important.

FIG. 10 to FIG. 16 are schematic views showing three examples of different periodicity regarding the layout of the segmented electrodes and the layout of the segmented orientations in each pixel in a display region.

Figure 10:
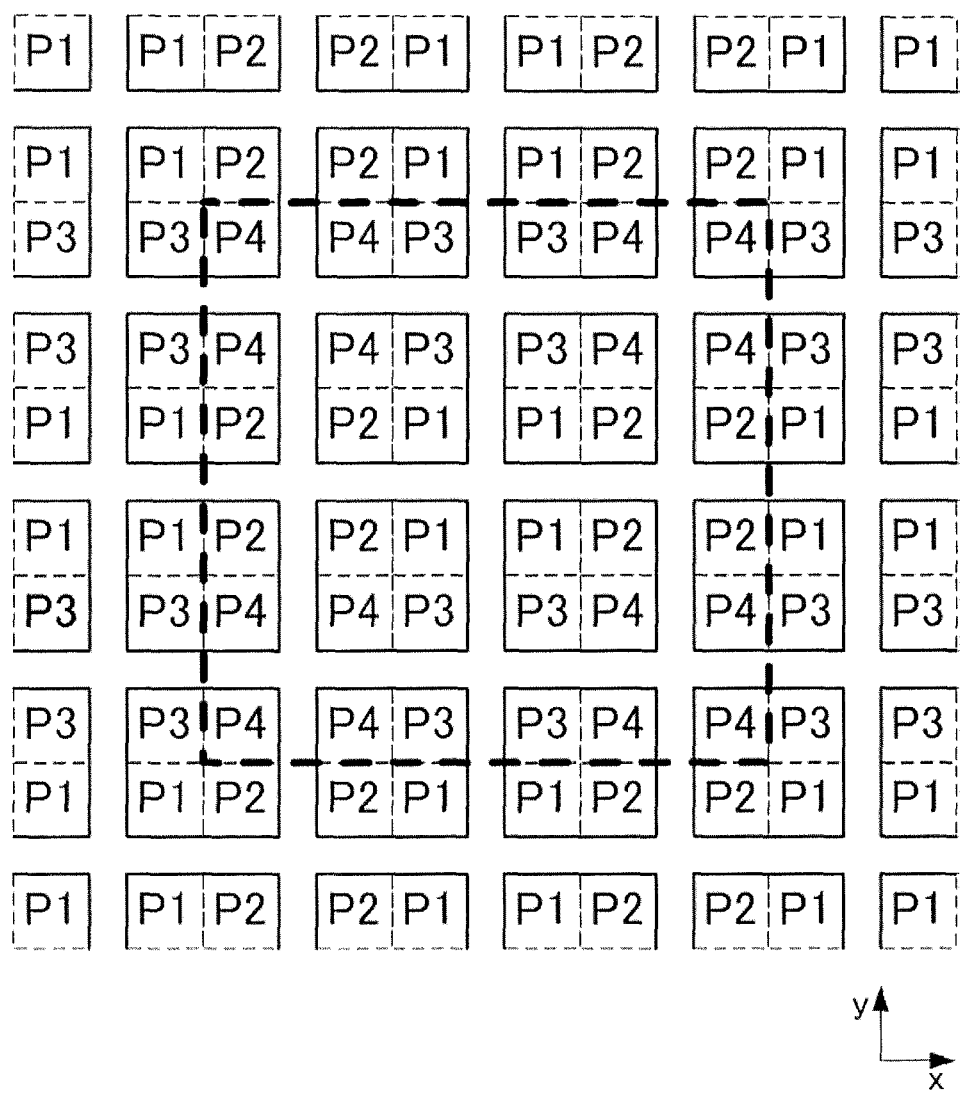
FIG. 10 is a schematic view showing an example of a layout of segmented electrodes of each pixel in a display region according to the first embodiment.
Figure 11:
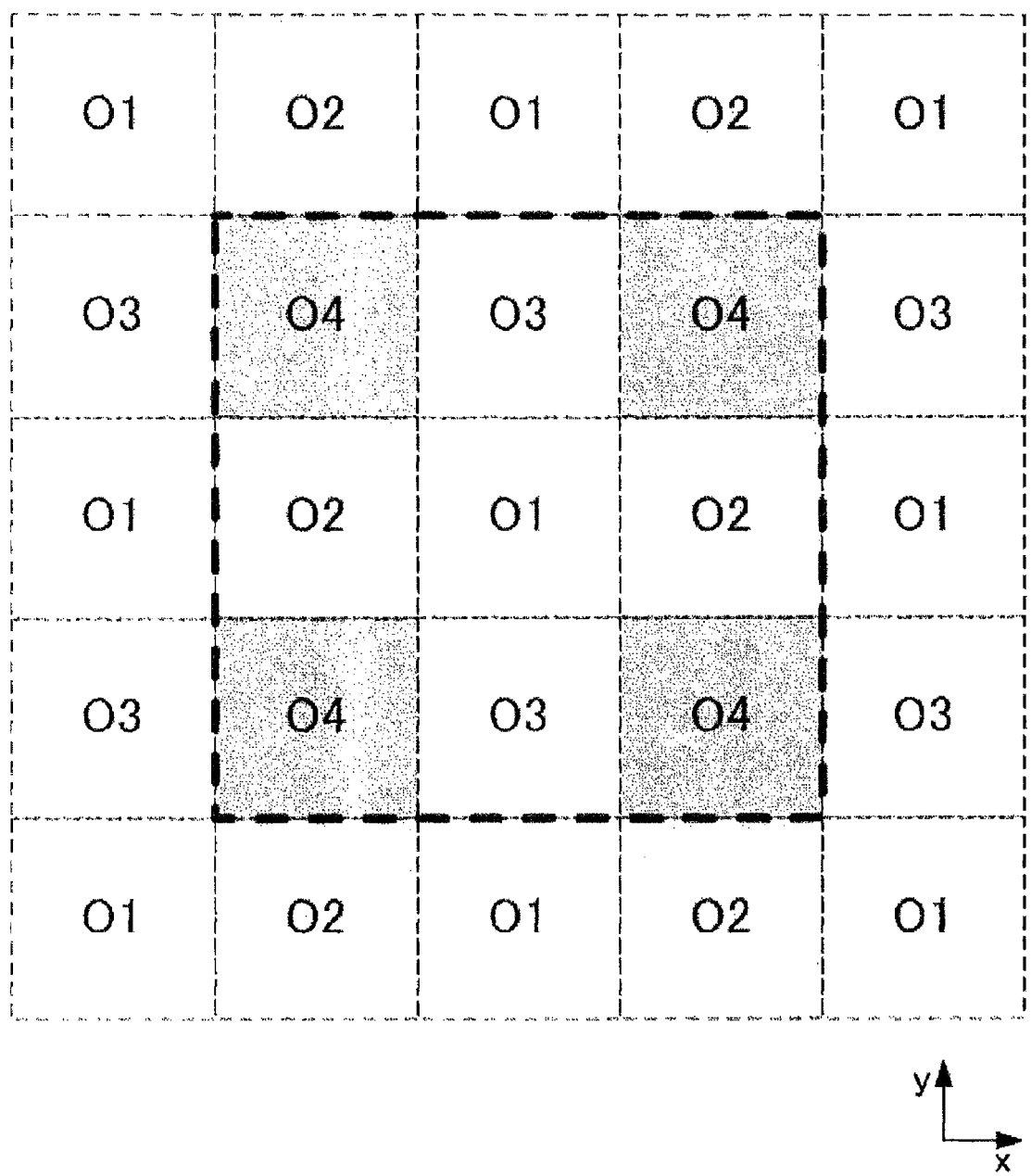
FIG. 11 is a schematic view showing an example of a layout of segmented orientation of each pixel in a display region according to the first embodiment.

The cases of FIG. 10 and FIG. 11 will be described. As shown in FIG. 10, a pixel is constituted with the segmented electrodes (P1, P2, P3, P4), and the display region is constituted with a combination of the four kinds of segmented electrode layout within the pixel. Further, the layout period of the pixel segmented electrodes is a pitch of two pixels in the X-direction and a pitch of two pixels in the Y-direction. For the region where the neighboring segmented electrodes are the same, the segmented orientation of the same irradiation axis or the same polarization axis (both are combined in some cases) is employed. As shown in FIG. 11, the liquid crystal orientation is constituted with the four segmented orientations (O1, O2, O3, O4), each of which is substantially in a same shape and same area with the pixel. The segmented orientation layout period is a pitch of two pixels in the X-direction and a pitch of two pixels in the Y-direction. The regions surrounded by a broken line in FIG. 10 and FIG. 11 shows substantially the same regions.

The mainstream of a photo-orientation processing method of segmented orientations is a method which segments the work substrate into a plurality of UV irradiation areas and performs mask exposure on the segmented regions by step feed. The combination of the segmented orientations in the case of FIG. 11 described above is completely the same pattern as the repeated period of the four segmented orientations (O1, O2, O3, O4) within the display region. Thus, it is possible to perform the four kinds of segmented orientation processing with a single mask. As an example, a segmented exposure mask that covers the segmented regions of the display region (work substrate) and an optical system of the photo-orientation processing whose irradiation axis or the polarization axis (both may be combined in some cases) can be determined arbitrarily are prepared. Further, the optical system irradiates UV light of non-polarization light or straight-line polarization light into the orientation film at an oblique direction for controlling the pre-tilt angle of the liquid crystal molecules in each segmented orientation region. Alternatively, the optical system may irradiate UV light of straight-line polarization light into the orientation film from the perpendicular direction in order to make the pre-tilt angle of the liquid crystal molecules "0".

Figure 12:
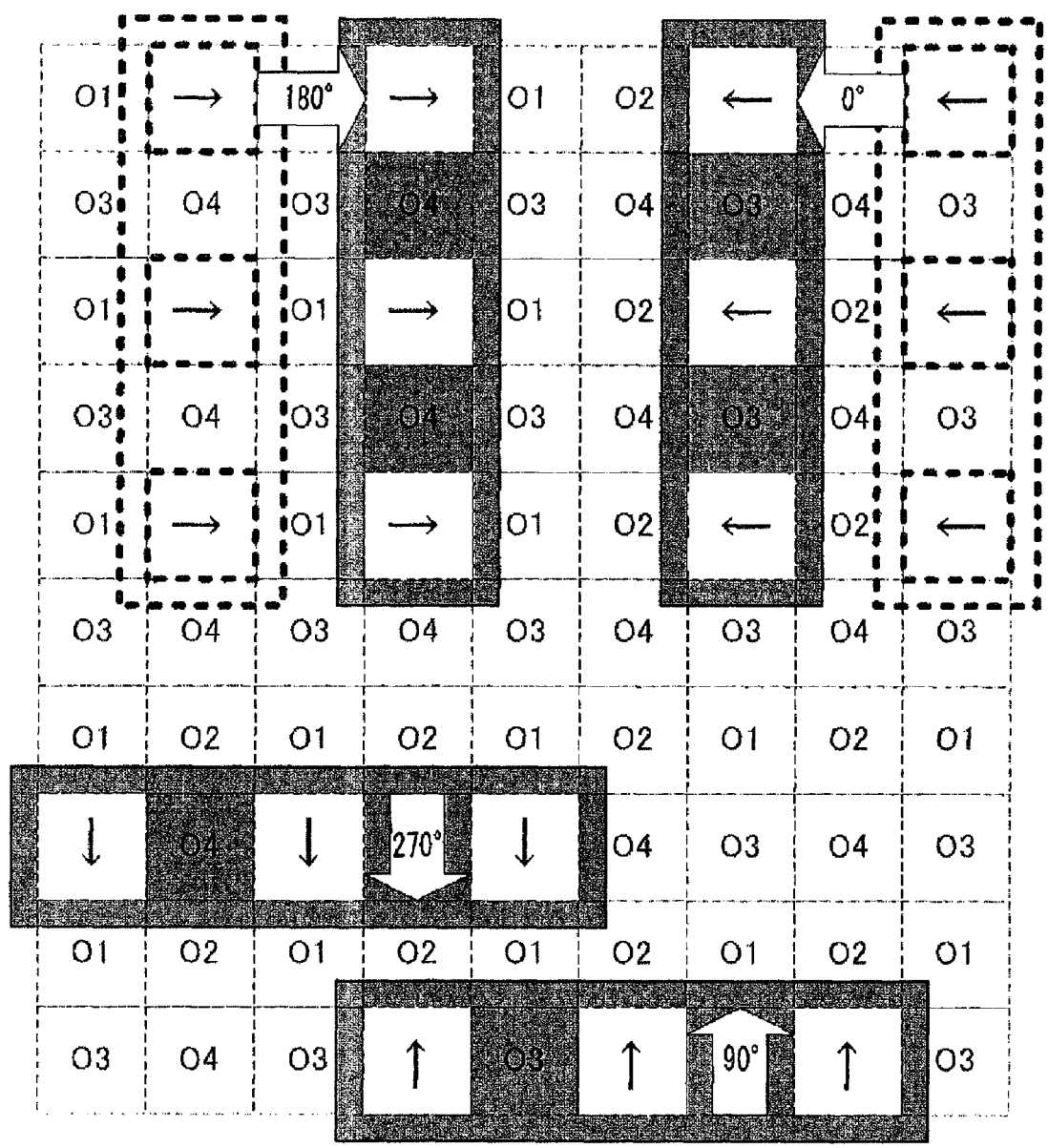
FIG. 12 is a schematic view which specifically shows a segmented mask exposure method using a same mask according to the first embodiment.

As shown in FIG. 12, in a case where it is desired to execute the orientation processing by changing the phases of the four segmented orientations at rotation angles of 90 degrees (0, 90, 180, 270 degrees), segmented exposure may be performed by step feeding the work substrate at each of the angles (0, 90, 180, 270 degrees) for the optical system of the photo-orientation processing. For example, segmented exposure of the orientation direction "←" is performed on all the regions to be the segmented orientation O1 by step feed. The work substrate is rotated, and segmented exposure of the orientation direction "→" is performed on all the regions to be the segmented orientation O2 by step feed. The work substrate is rotated, and segmented exposure of the orientation direction "↓" is performed on all the regions to be the segmented orientation O3 by step feed. The work substrate is rotated, and segmented exposure of the orientation direction "↑" is performed on all the regions to be the segmented orientation O4 by step feed. One kind of the mask is used at this time.

Figure 13:
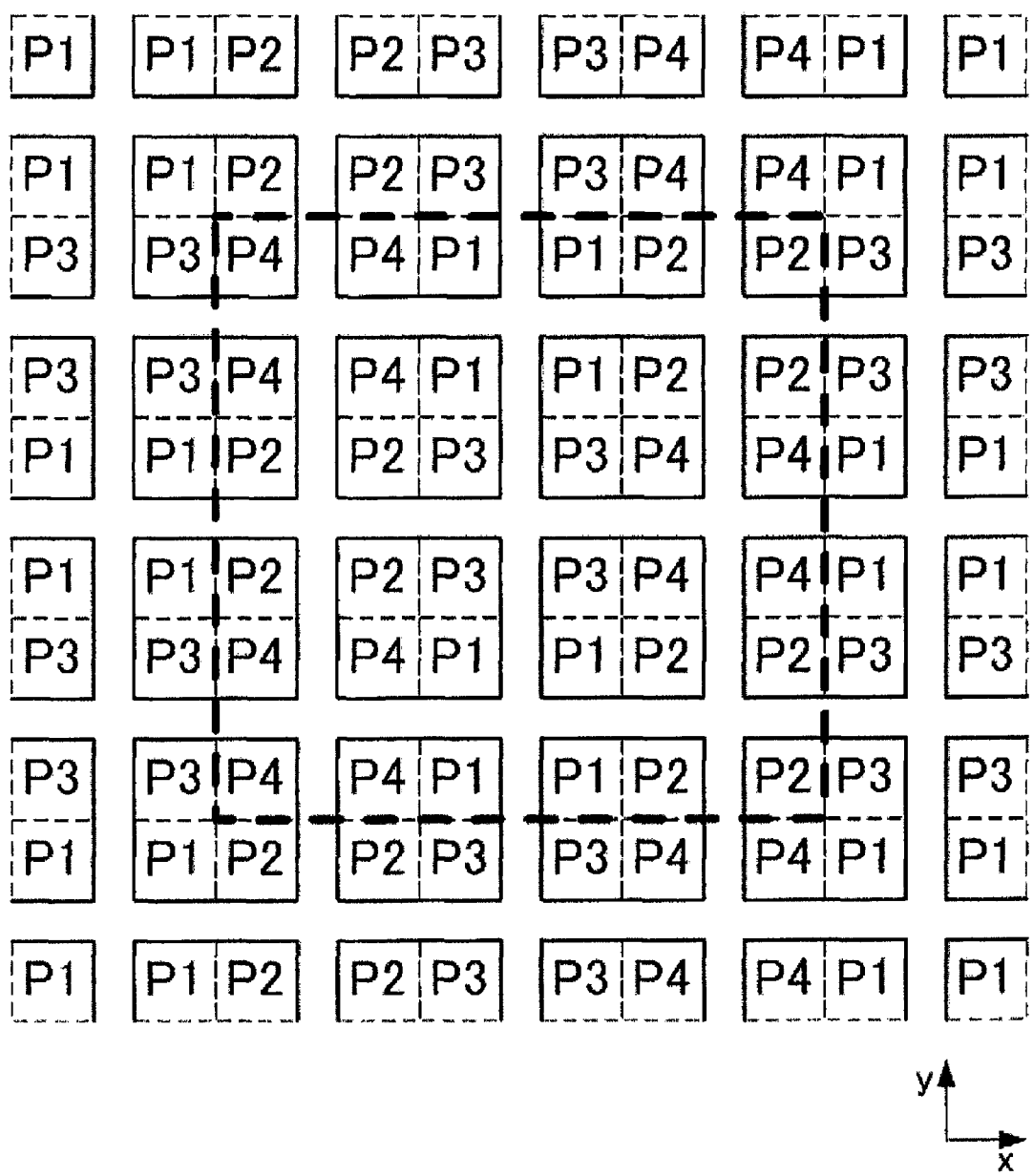
FIG. 13 is a schematic view showing an example of different periodicity of a layout of segmented electrodes of each pixel in a display region according to the first embodiment.
Figure 14:
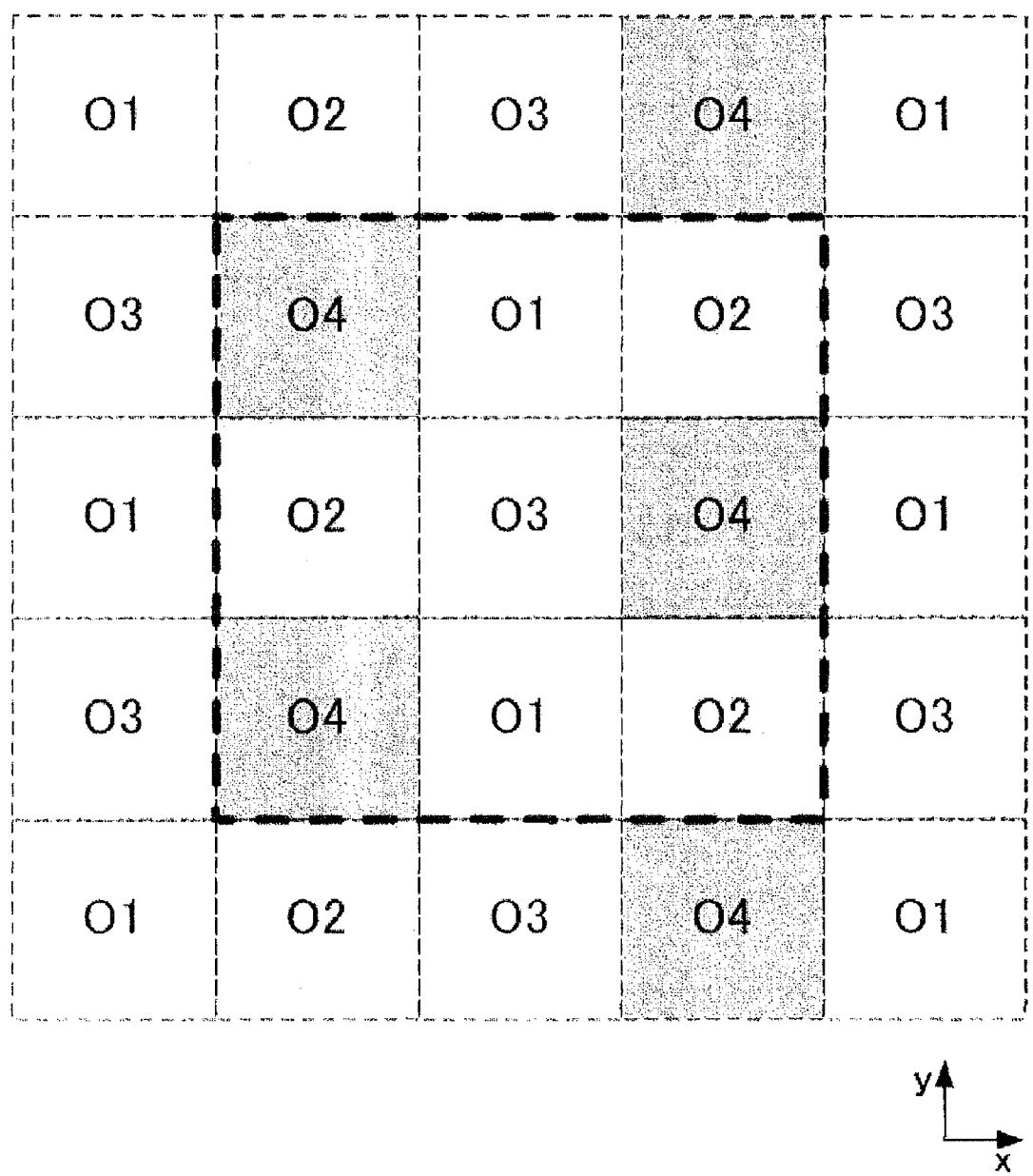
FIG. 14 is a schematic view showing an example of different periodicity of a layout of segmented orientations of each pixel in a display region according to the first embodiment.

The cases of FIG. 13 and FIG. 14 will be described. As shown in FIG. 13, a pixel is constituted with the segmented electrodes (P1, P2, P3, P4), and the display region is constituted with a combination of the four kinds of segmented electrode layout within the pixel. Further, the layout period of the pixel segmented electrodes is a pitch of four pixels in the X-direction and a pitch of two pixels in the Y-direction. For the region where the neighboring segmented electrodes are the same, the segmented orientation of the same irradiation axis or the same polarization axis (both are combined in some cases) is employed. As shown in FIG. 14, the liquid crystal orientation is constituted with the four segmented orientations (O1, O2, O3, O4), each of which are substantially in a same shape and same area with the pixel. The segmented orientation layout period is a pitch of four pixels in the X-direction and a pitch of two pixels in the Y-direction. The regions surrounded by a broken line in FIG. 13 and FIG. 14 shows substantially the same regions.

In the combination of the segmented orientations in the case of FIG. 14 described above, the orientation periods of the segmented orientations are different in the X-direction and the Y-direction as shown in FIG. 14. Thus, in a case where it is desired to execute the orientation processing by changing the phases of the four segmented orientations at rotation angles of 90 degrees (0, 90, 180, 270 degrees), the orientation periods become the same when the work substrate is rotated at 0 degrees and at 180 degrees for the optical system of the photo-orientation processing and also become the same when rotated at 90 degrees and at 270 degrees. Thus, it is possible to perform four kinds of segmented orientation processing with two masks for the X-direction feed processing and for the Y-direction feed processing.

Figure 15:
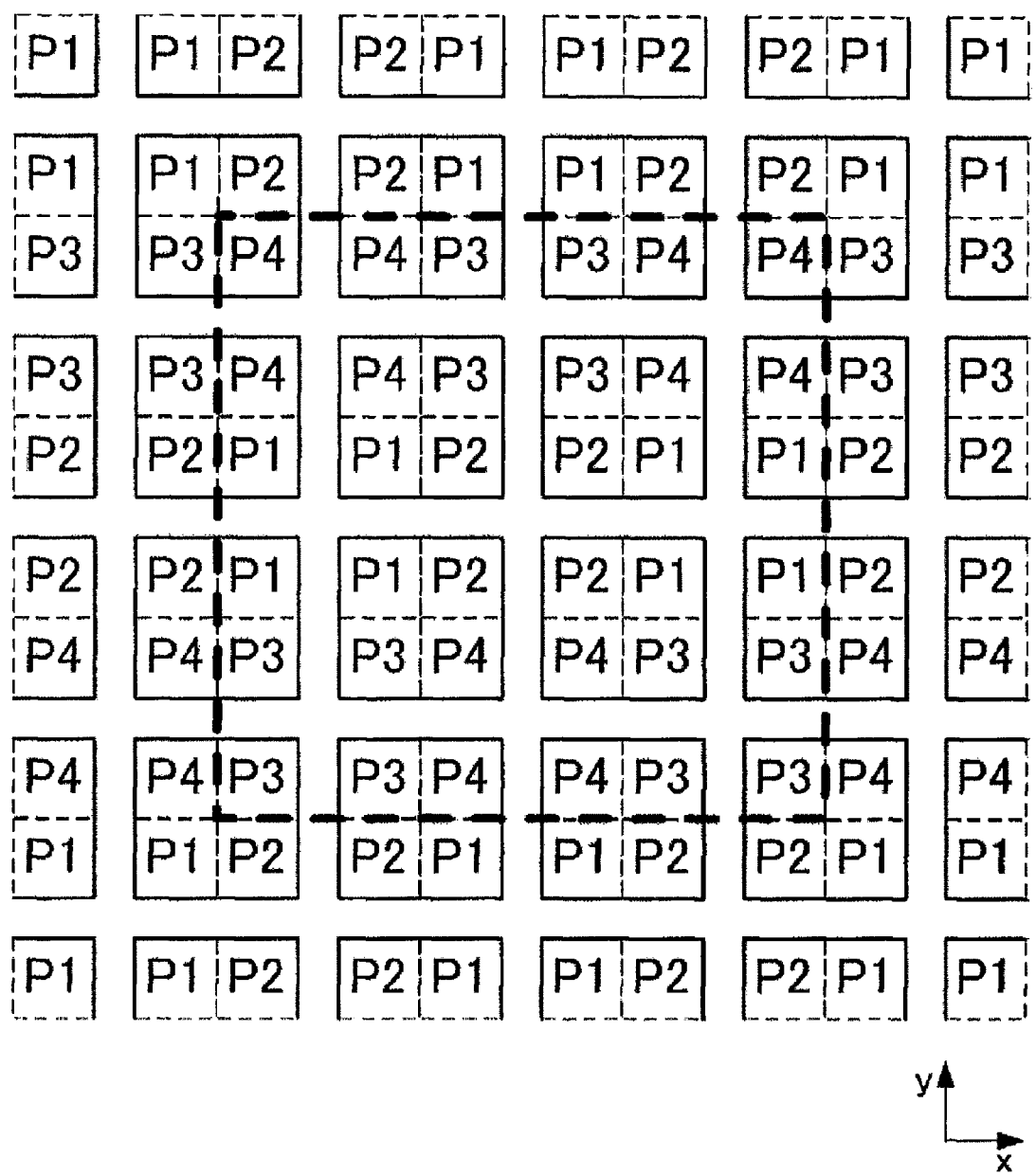
FIG. 15 is a schematic view showing another example of different periodicity of a layout of segmented electrodes of each pixel in a display region according to the first embodiment.
Figure 16:
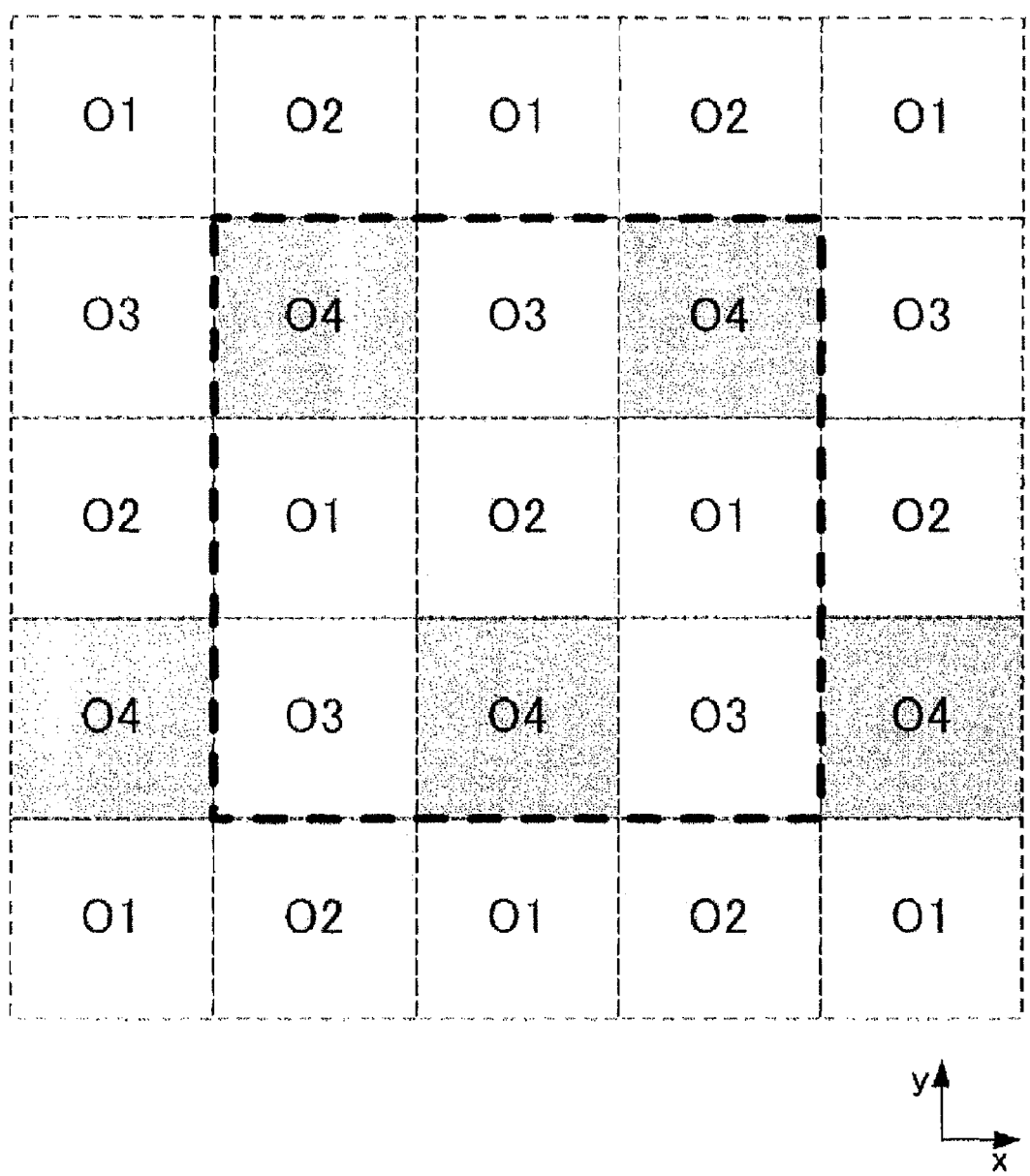
FIG. 16 is a schematic view showing another example of different periodicity of a layout of segmented orientations of each pixel in a display region according to the first embodiment.

The cases of FIG. 15 and FIG. 16 will be described. As shown in FIG. 15, a pixel is constituted with the segmented electrodes (P1, P2, P3, P4), and the display region is constituted with a combination of the four kinds of segmented electrode layout within the pixel. Further, the layout period of the pixel segmented electrodes is a pitch of two pixels in the X-direction and a pitch of four pixels in the Y-direction. For the region where the neighboring segmented electrodes are the same, the segmented orientation of the same irradiation axis or the same polarization axis (both are combined in some cases) is employed. As shown in FIG. 16, the liquid crystal orientation is constituted with the four segmented orientations (O1, O2, O3, O4), each of which are substantially in a same shape and same area with the pixel. The segmented orientation layout period is a pitch of two pixels in the X-direction and a pitch of four pixels in the Y-direction. The regions surrounded by a broken line in FIG. 15 and FIG. 16 shows substantially the same regions.

In the combination of the segmented orientations in the case of FIG. 16 described above, the orientation periods of the segmented orientations are different in the X-direction and the Y-direction as shown in FIG. 16. Thus, in a case where it is desired to execute the orientation processing by changing the phases of the four segmented orientations at rotation angles of 90 degrees (0, 90, 180, 270 degrees), the layout periods become the same when the work substrate is rotated at 0 degrees and at 180 degrees for the optical system of the photo-orientation processing and also become the same when rotated at 90 degrees and at 270 degrees. Thus, it is possible to perform four kinds of segmented orientation processing with two masks for the X-direction feed processing and for the Y-direction feed processing.

Second Embodiment

FIG. 17 is a schematic view showing an example of a structure in which segmented electrodes and segmented orientations are combined according to a second embodiment of the liquid crystal display device of the present invention.

Figure 17A:
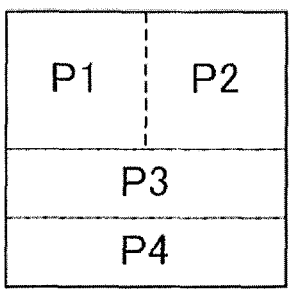
FIG. 17 is a schematic view showing an example of a structure of a second embodiment in which segmented electrodes and segmented orientations are combined.
Figure 17B:
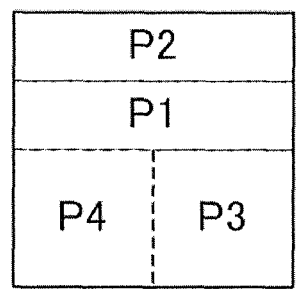
Figure 17C:
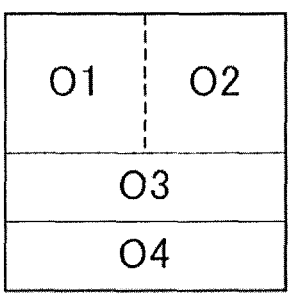
Figure 17D:
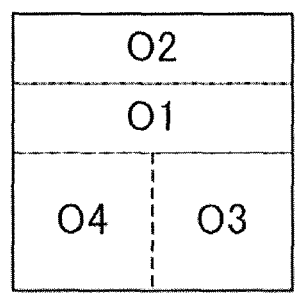
Figure 17E:
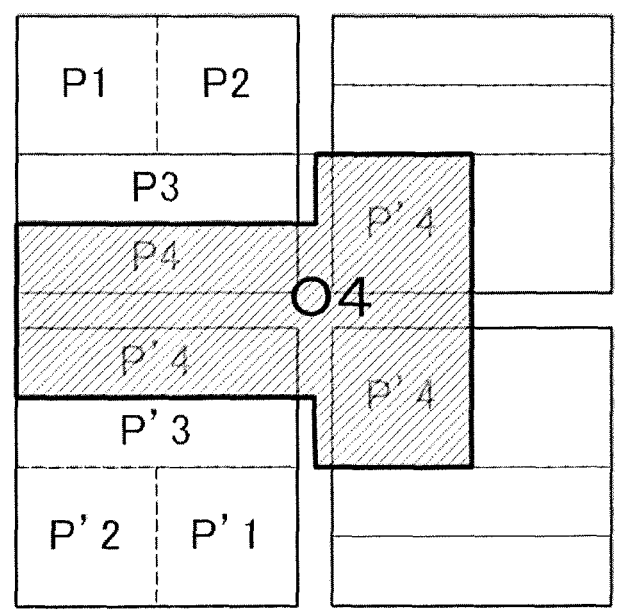

The liquid crystal display device of the second embodiment includes segmented electrodes (P1, P2, P3, P4) segmented into four as shown in FIGS. 17A, 17B and segmented orientations (O1, O2, O3, O4) segmented into four orientations as shown in FIGS. 17C, 17D, and it is constituted with a layout relation in the different imposition direction from that of the first embodiment. Further, FIG. 17E shows a positional relation between the segmented electrodes and the segmented orientations. In FIG. 17E, four neighboring pixels are shown, and a single pixel is constituted with four segmented electrodes (P1, P2, P3, P4). Furthermore, the segmented electrodes of the pixels adjacent to the pixel 17A on the right side and the lower side are in the structure of FIG. 17B, while the pixel on the obliquely lower right side is in the structure of 17A. In the case shown in FIG. 17E, the segmented electrode P4 is in the same structure as that of the segmented electrodes P'4 of the neighboring pixels (three positions on the right, below, and lower right). Further, the area surrounding the four segmented electrodes P4 (P'4) of the same structure within the neighboring four pixels is processed with the same segmented orientation (O4).

Figure 18:
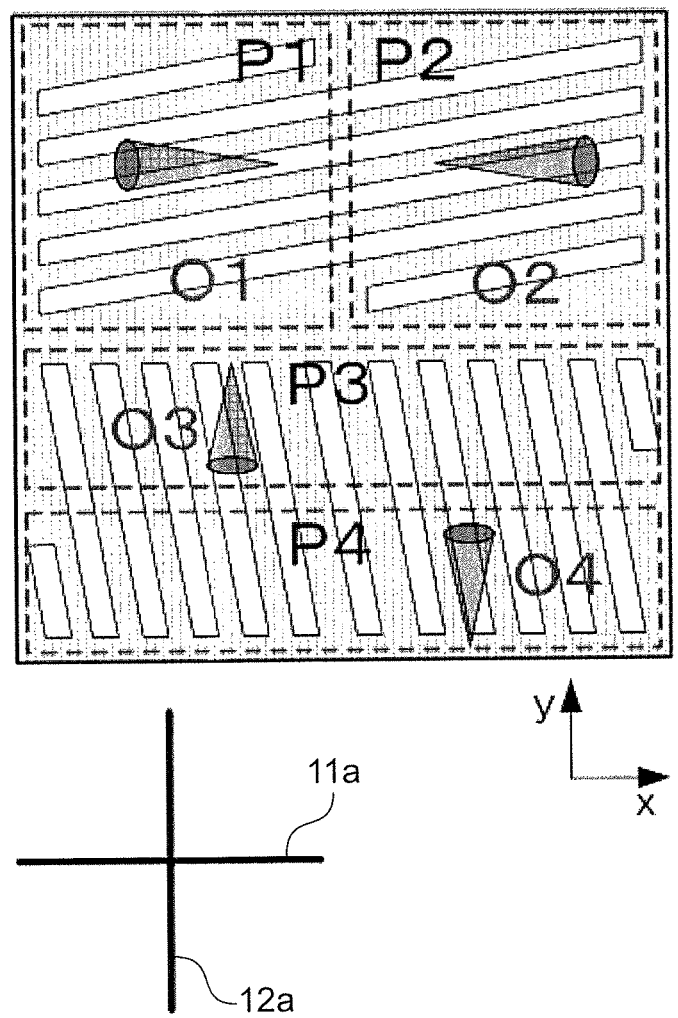
FIG. 18 is a plan view (1) which specifically shows a combination of segmented electrodes and segmented orientations within a pixel according to the second embodiment.
Figure 19:
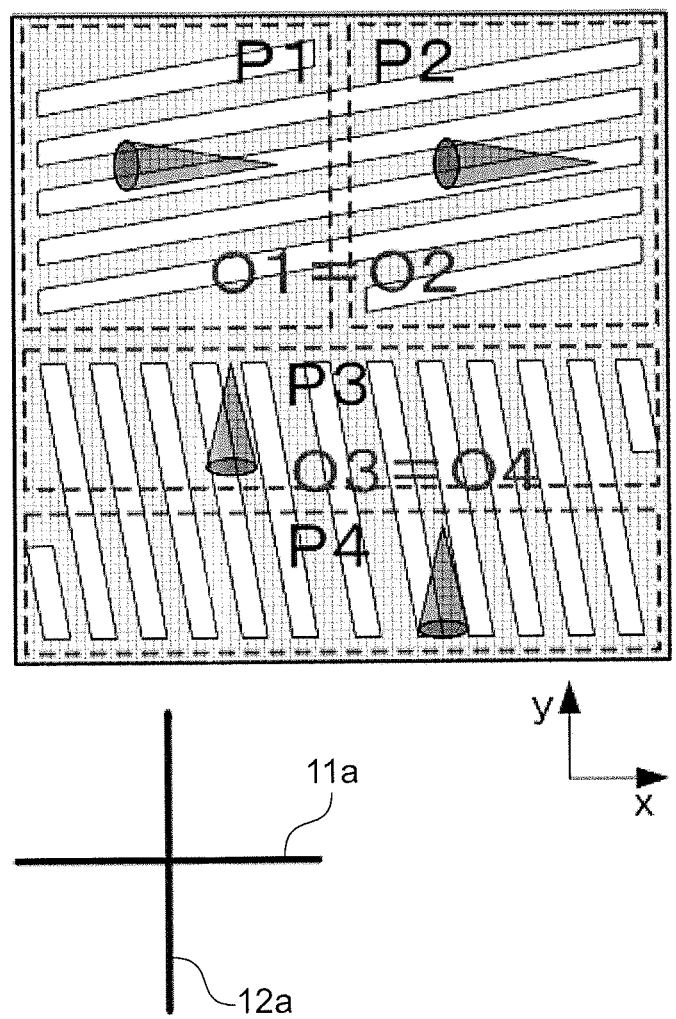
FIG. 19 is a plan view (2) which specifically shows a combination of segmented electrodes and segmented orientations within a pixel according to the second embodiment.

FIG. 18 and FIG. 19 are plan views which specifically show combinations of the segmented electrodes and the segmented orientations within a single pixel based on the above-described content. Shown as a way of examples are the FFS type as the segmented electrodes, and the orientation direction and tilt angle (pre-tilt angle) of the liquid crystal aligned homogeneously and, further, a polarization axis 11a of a TFT substrate as well as a polarization axis 12a of a CF substrate as the segmented orientations. While the shown in the second embodiment is the FFS type, the present invention is preferable for lateral electric field type devices such as an IPS type and a combination of the FFS type and the IPS type. Further, the present invention can be applied to the other types as well.

In FIG. 18, the four segmented electrodes (P1, P2, P3, P4) are different from each other, and the four segmented orientations (O1, O2, O3, O4) are different from each other as well. In FIG. 19, O1 and O2 are the same orientations (O1=O2), and O3 and O4 are the same orientations (O3=O4) among the four segmented orientations (O1, O2, O3, O4).

Figure 20:
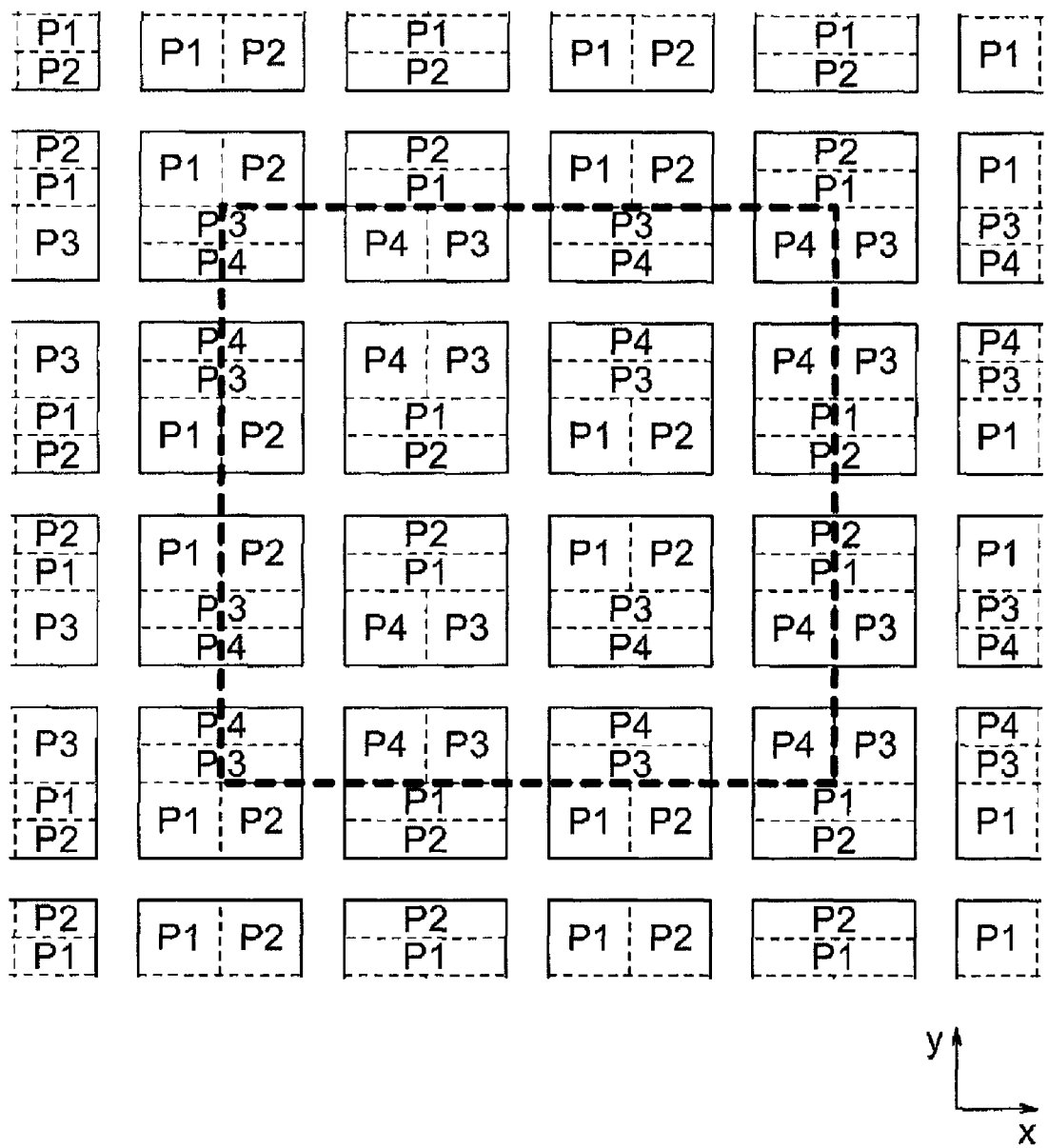
FIG. 20 is a schematic view showing an example of a layout of segmented electrodes of each pixel in a display region according to the second embodiment.
Figure 21:
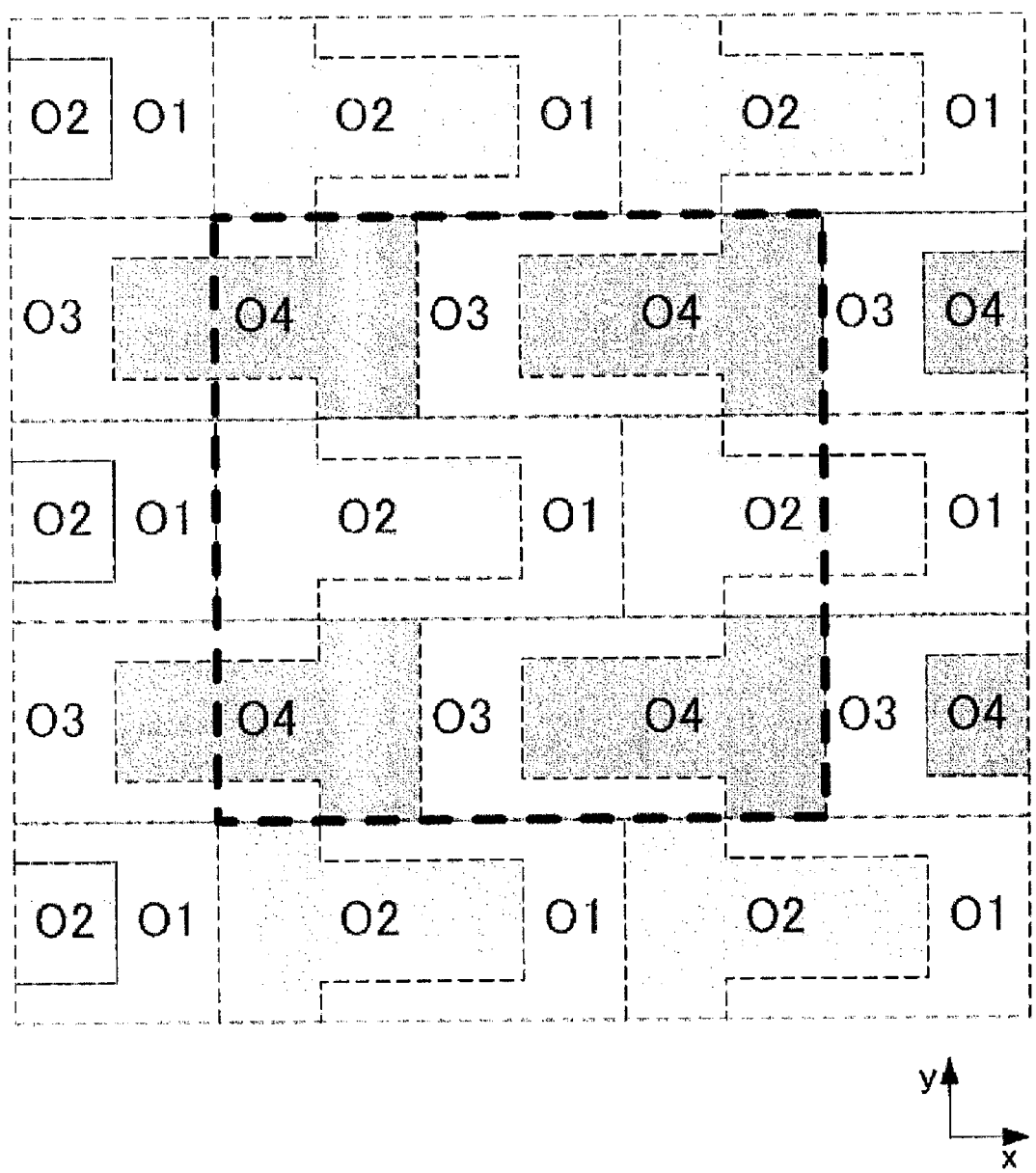
FIG. 21 is a schematic view showing an example of a layout of segmented orientations of each pixel in a display region according to the second embodiment.

FIG. 20 and FIG. 21 are schematic views showing examples of the layout of segmented electrodes and the layout of segmented orientations in each pixel of the display region. Hereinafter, the second embodiment will be described.

As shown in FIG. 20, a pixel is constituted with four segmented electrodes (P1, P2, P3, P4), and the display region is constituted with a combination of four kinds of segmented electrode layout within a pixel. Further, the layout period of the pixel segmented electrodes is a pitch of two pixels in the X-direction and a pitch of two pixels in the Y-direction. For the region where the neighboring segmented electrodes are the same, the segmented orientation of the same irradiation axis or the same polarization axis (both are combined in some cases) is employed. As shown in FIG. 21, the liquid crystal orientation is constituted with the two laterally recessed-shape segmented orientations (O1, O3) and the two laterally projected-shape segmented orientations (O2, O4), and the segmented orientation layout period is a pitch of two pixels in the X-direction and a pitch of two pixels in the Y-direction. The regions surrounded by a broken line in FIG. 20 and FIG. 21 shows substantially the same regions.

In the combination of the segmented orientations in the case of FIG. 21 described above, the layout period of the segmented orientations is a pitch of two pixels both in the X-direction and the Y-direction as shown in FIG. 21. Further, the phases of the segmented orientation (O1) and the segmented orientation (O3) and the phases of the segmented orientation (O2) and the segmented orientation (O4) are shifted from each other by 180 degrees. Thus, in a case where it is desired to execute the orientation processing by changing the phases of the four segmented orientations at rotation angles of 90 degrees (0, 90, 180, 270 degrees), the layout periods become the same when the work substrate is rotated at 0 degrees and at 180 degrees for the optical system of the photo-orientation processing and also become the same when rotated at 90 degrees and at 270 degrees. Thus, it is possible to perform four kinds of segmented orientation processing with two masks for the X-direction feed processing and for the Y-direction feed processing.

Third Embodiment

Figure 22:
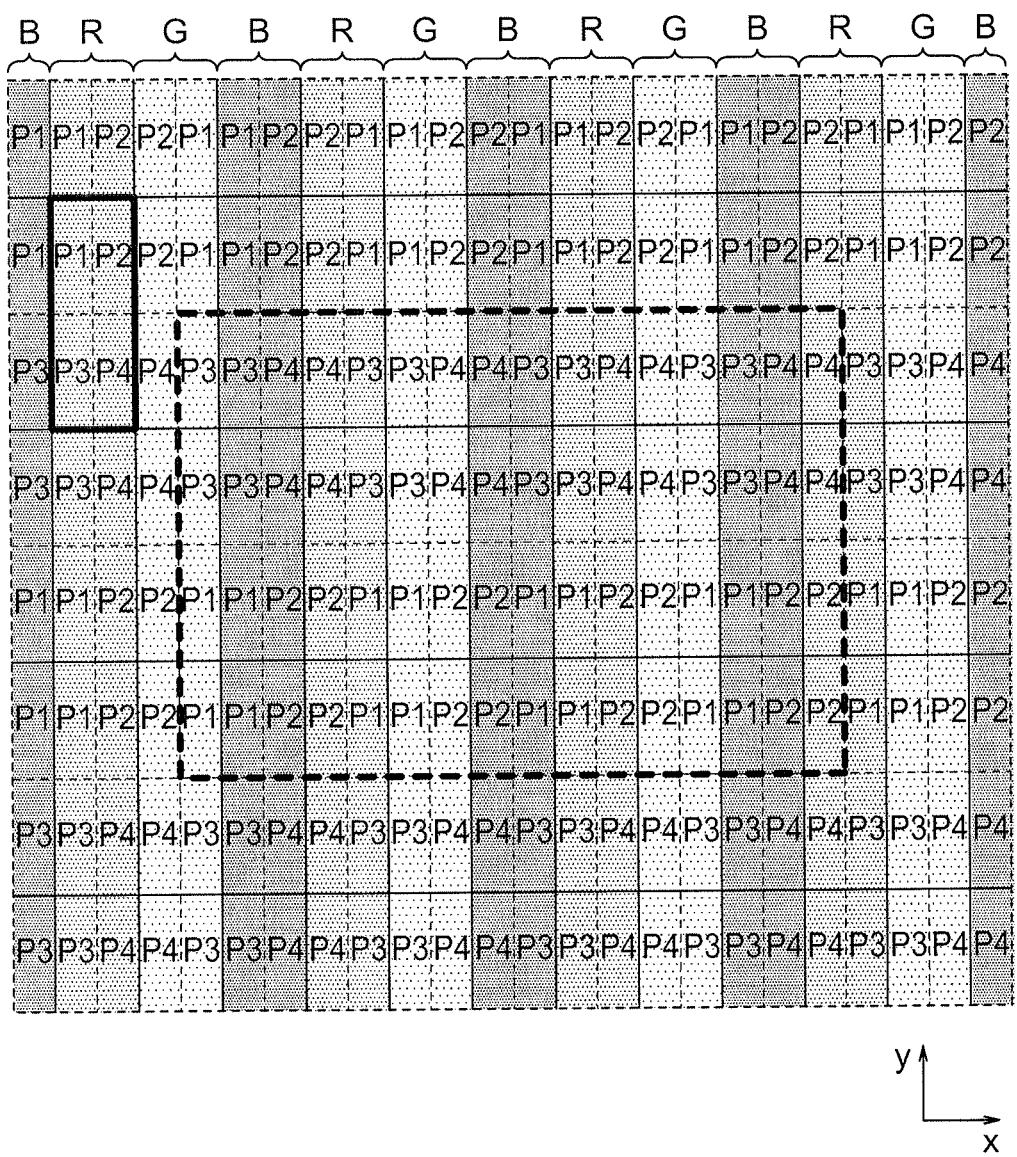
FIG. 22 is a schematic view showing an example of periodicity of a layout of segmented electrodes of each sub-pixel in a display region according to a third embodiment.
Figure 23:
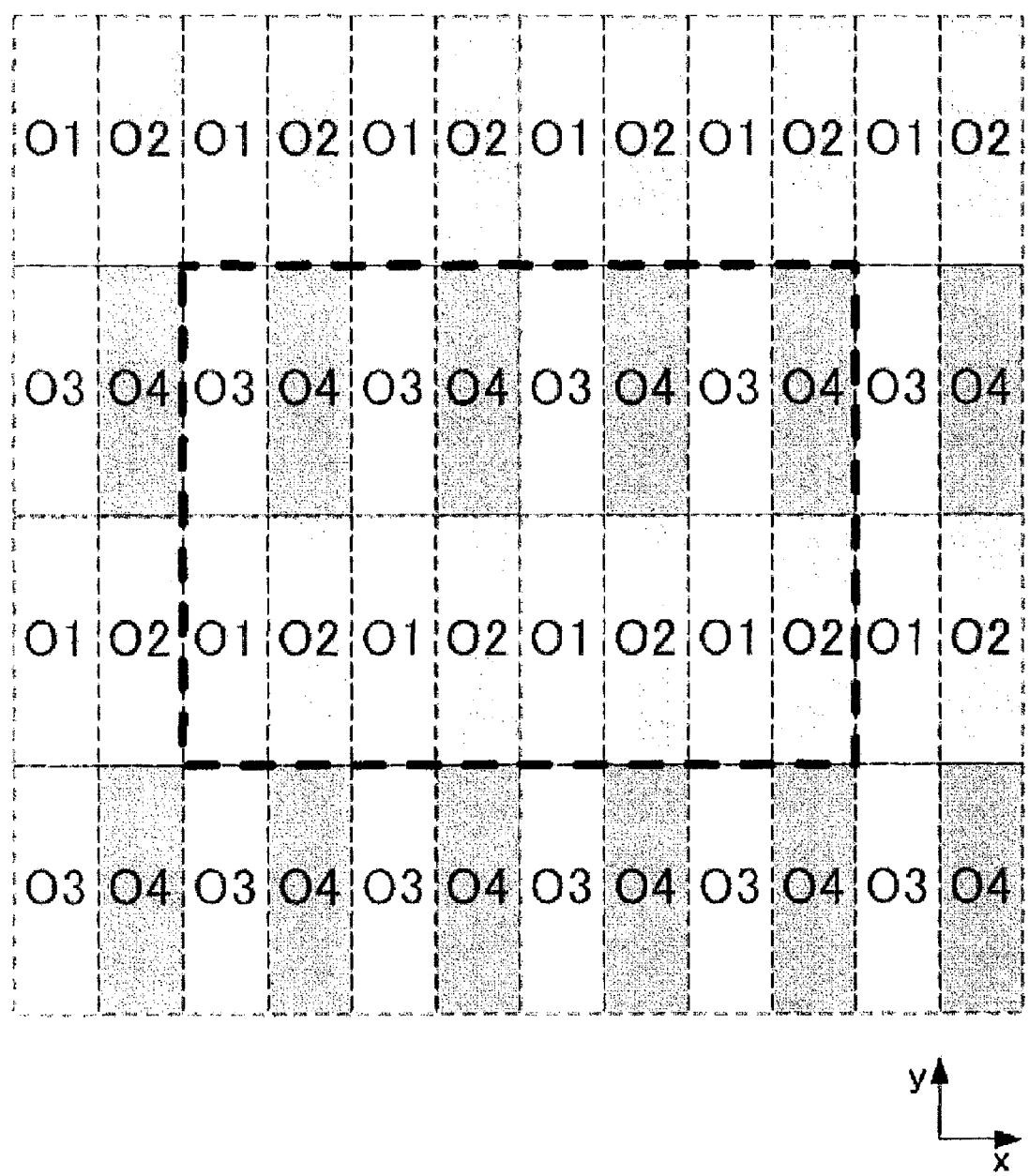
FIG. 23 is a schematic view showing an example of periodicity of a layout of segmented orientations of each sub-pixel in a display region according to the third embodiment.

The liquid crystal display device according to the present invention can be applied not only by a unit of pixel but also by a unit of sub-pixel constituted with a combination with color filters (CF). FIG. 22 and FIG. 23 are schematic views showing examples of the layout of segmented electrodes and the layout of segmented orientations in each sub-pixel of the display region of a liquid crystal display device according to a third embodiment. Hereinafter, the third embodiment will be described.

As shown in FIG. 22, a sub-pixel (a unit of a solid thick line in a rectangular shape in the drawing) is constituted with four segmented electrodes (P1, P2, P3, P4), and the display region is constituted with a combination of the four kinds of segmented electrode layout within the sub-pixel. Further, the layout period of the pixel segmented electrodes within a sub-pixel is a pitch of two sub-pixels in the X-direction and a pitch of two sub-pixels in the Y-direction. For the region where the neighboring segmented electrodes are the same, the segmented orientation of the same irradiation axis or the same polarization axis (both are combined in some cases) is employed. As shown in FIG. 23, the liquid crystal orientation is constituted with the four segmented orientations (O1, O2, O3, O4), each of which are substantially in a same shape and same area with the sub-pixel. The segmented orientation layout period is a pitch of two sub-pixels in the X-direction and a pitch of two sub-pixels in the Y-direction. The regions surrounded by a broken line in FIG. 22 and FIG. 23 shows substantially the same regions. In FIG. 22, R, B, and G show the color filter colors (Red, Green, and Blue), respectively.

The combination of the segmented orientations in the case of FIG. 23 described above is completely the same pattern as the repeated period of the four segmented orientations (O1, O2, O3, O4) within the display region. Thus, it is possible to perform the four kinds of segmented orientation processing with a single mask. As an example, a segmented exposure mask that covers the segmented regions of the display region (work substrate) and an optical system of the photo-orientation processing whose irradiation axis or the polarization axis (both may be combined in some cases) can be determined arbitrarily are prepared. Further, the optical system irradiates UV light of non-polarization light or straight-line polarization light into the orientation film at an oblique direction for controlling the pre-tilt angle of the liquid crystal molecules in each segmented orientation region. Alternatively, the optical system may irradiate UV light of straight-line polarization light into the orientation film from the perpendicular direction in order to make the pre-tilt angle of the liquid crystal molecules "0". In a case where it is desired to execute the orientation processing by changing the phases of the four segmented orientations at rotation angles of 90 degrees (0, 90, 180, 270 degrees), segmented exposure may be performed by step feeding the work substrate by rotating it at each of the angles (0, 90, 180, 270 degrees) for the optical system of the photo-orientation processing.

Fourth Embodiment

Figure 24:
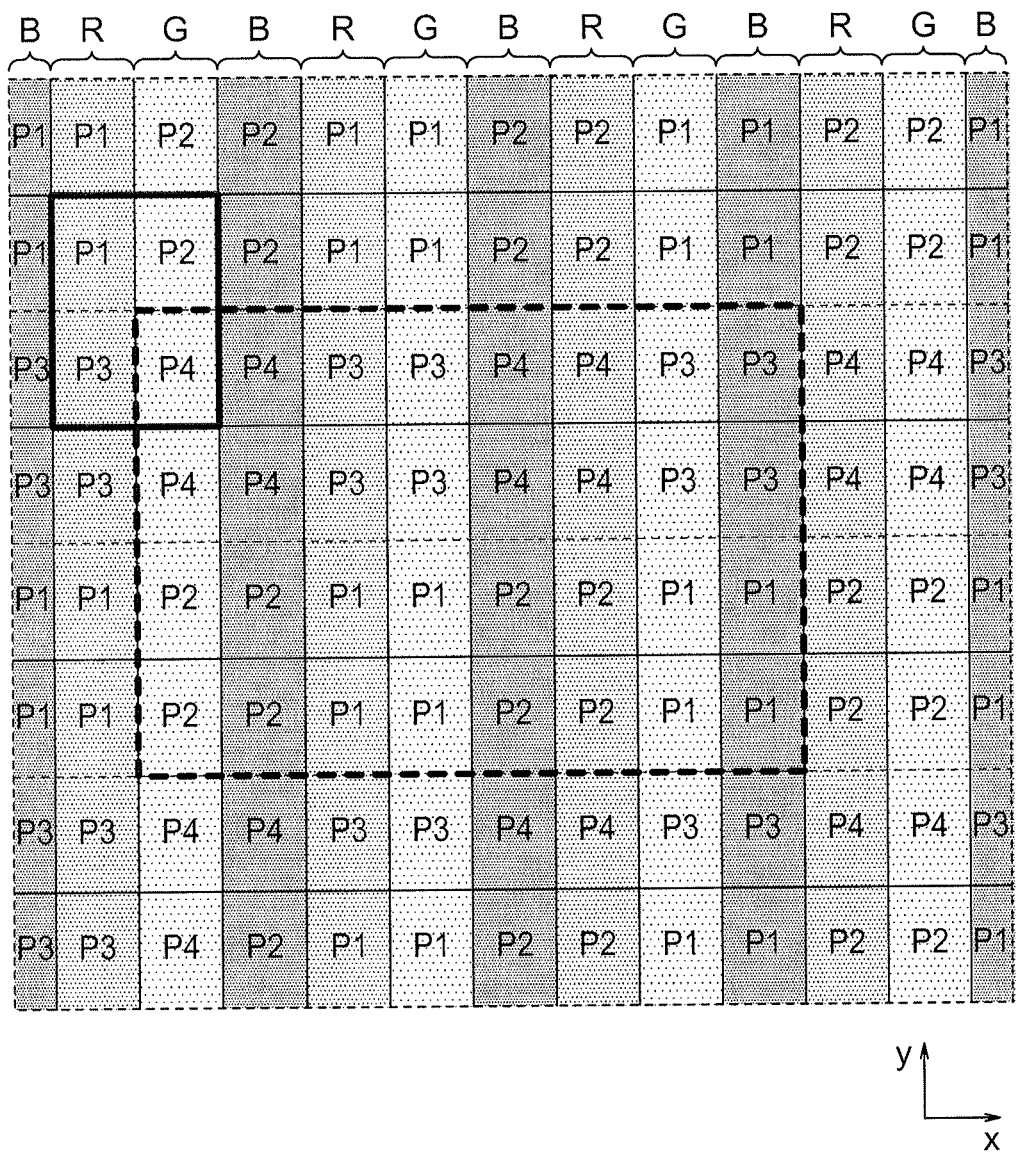
FIG. 24 is a schematic view showing an example of periodicity of a layout of segmented electrodes of two sub-pixels each in a display region according to a fourth embodiment.
Figure 25:
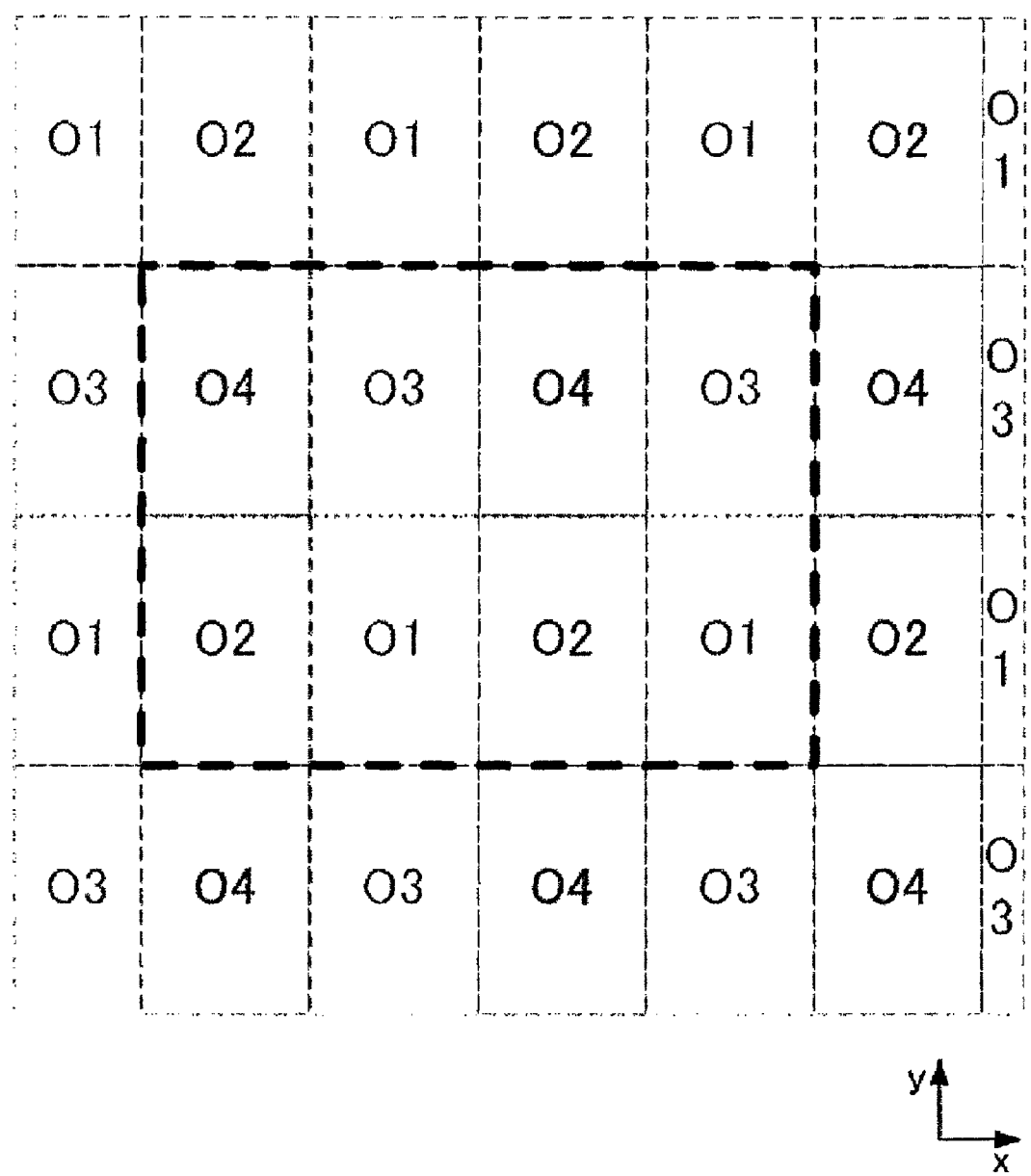
FIG. 25 is a schematic view showing an example of periodicity of a layout of segmented orientations of two sub-pixels each in a display region according to the fourth embodiment.
Figure 26:
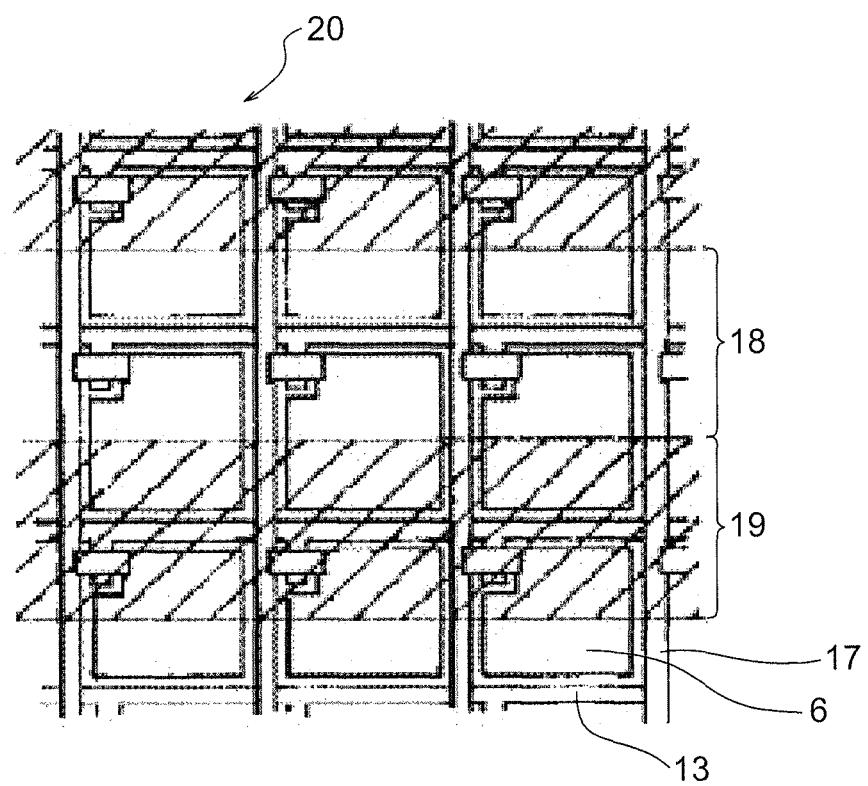
FIG. 26 is a view showing a technique depicted in Patent Document 1.
Figure 27:
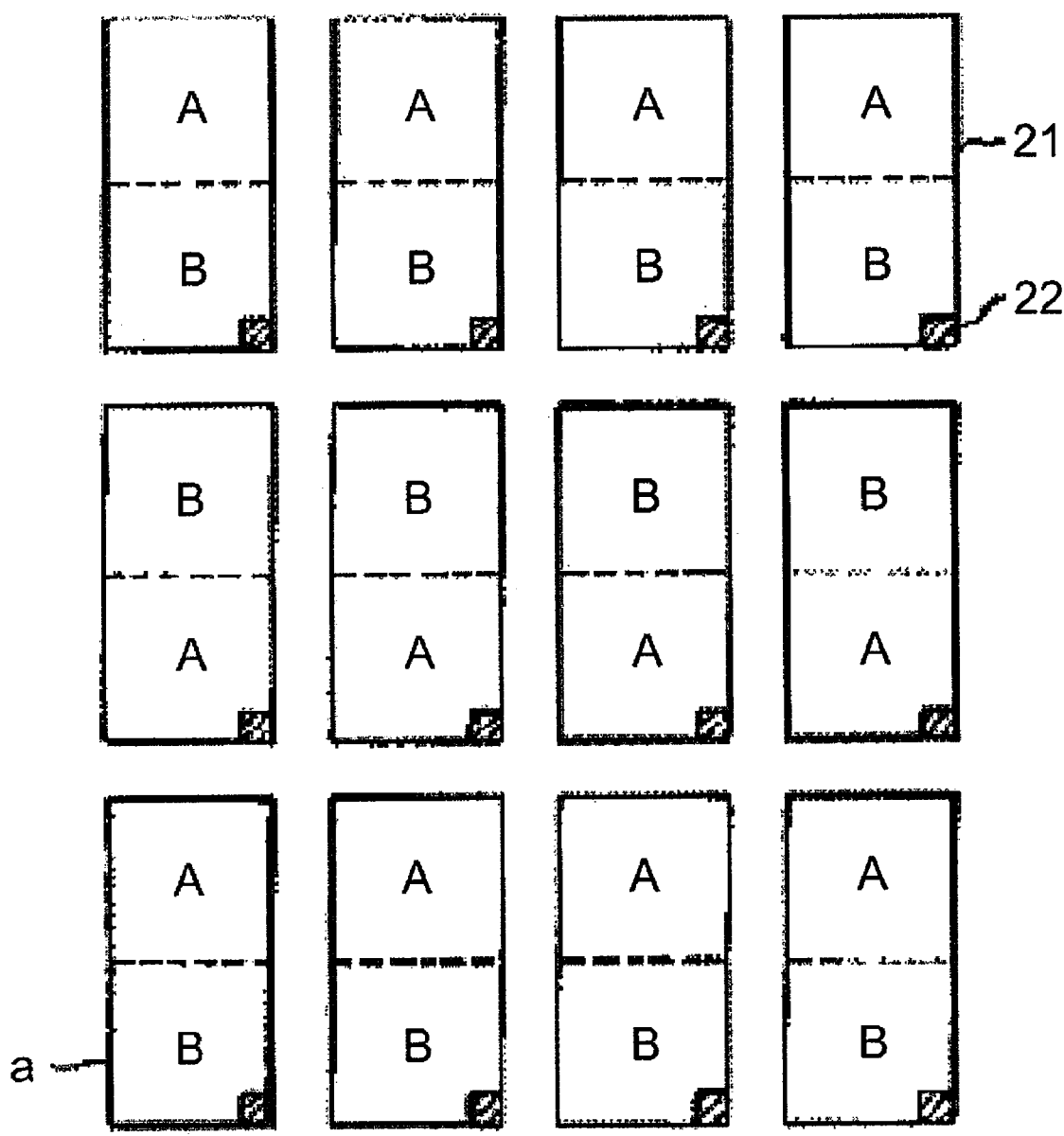
FIG. 27 is a view showing a technique depicted in Patent Document 2.
Figure 29A:
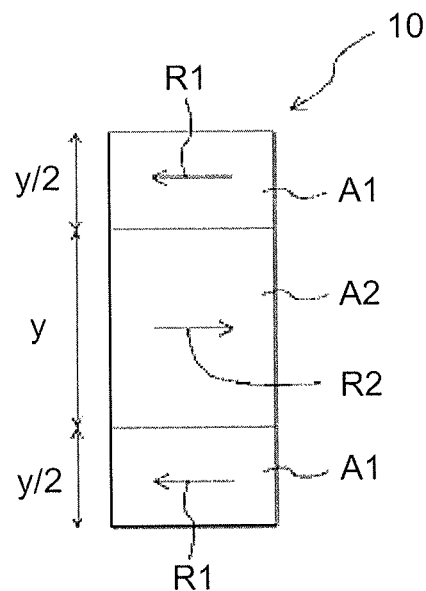
FIG. 29 is a view showing a technique depicted in Patent Document 4.
Figure 29B:
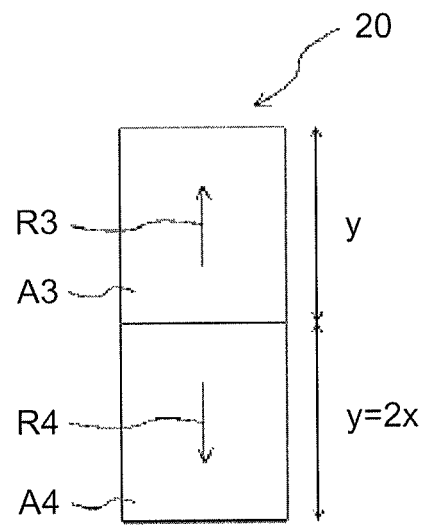
Figure 29C:
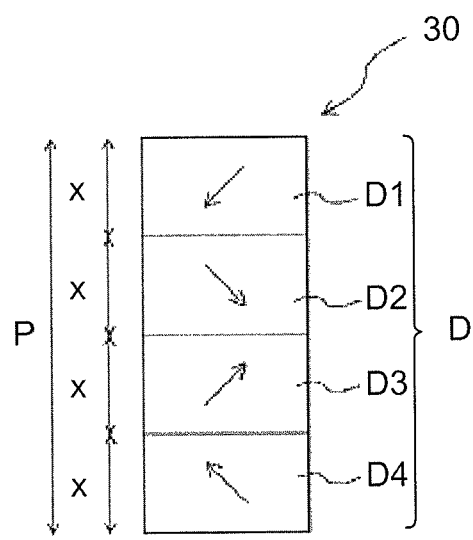
Figures 30A, 30B:
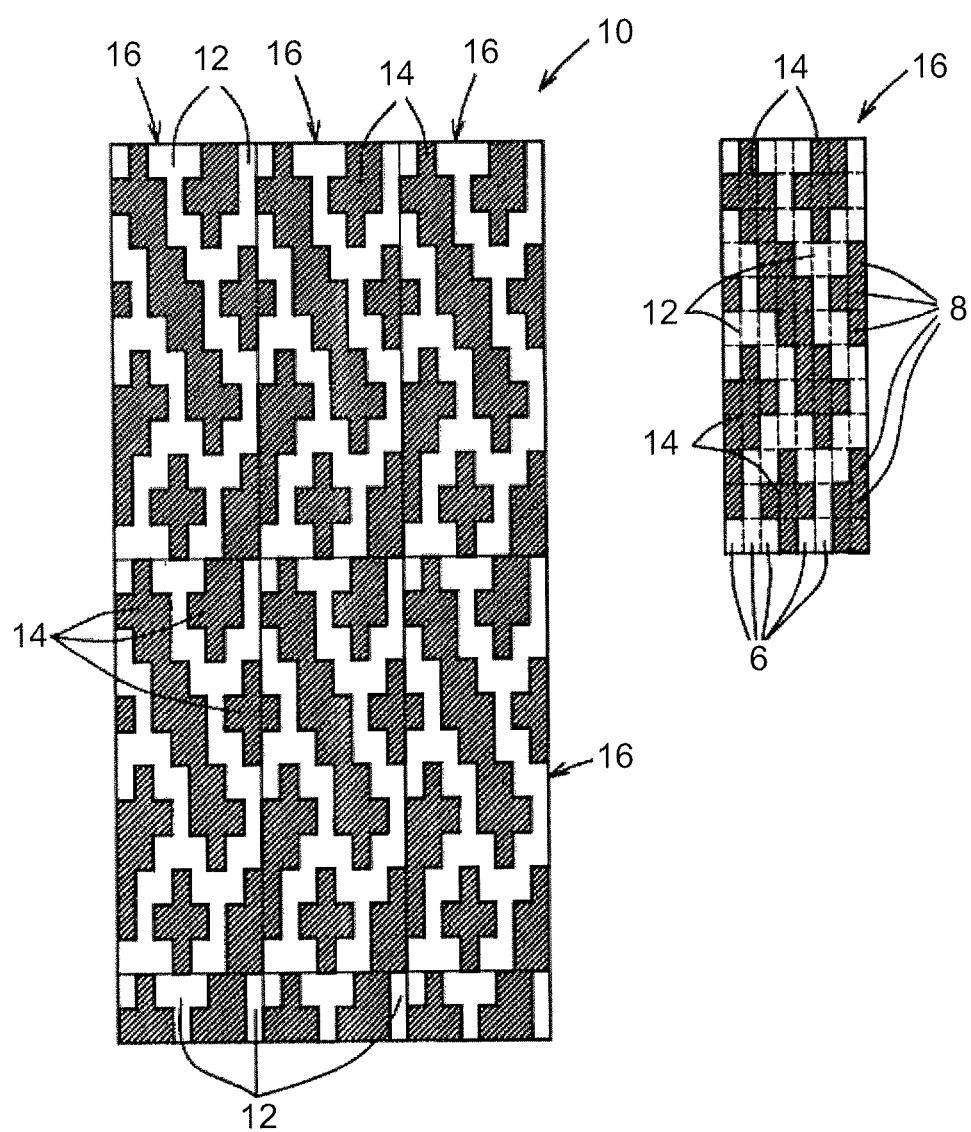
FIG. 30 is a view showing a technique depicted in Patent Document 5.

The liquid crystal display device according to the present invention can also be applied with a unit in which a plurality of sub-pixels of the color filters (CF) are combined. FIG. 24 and FIG. 25 are schematic views showing examples of the layout of segmented electrodes and the layout of segmented orientations in each two sub-pixels of the display region of the liquid crystal display device according to a fourth embodiment. Hereinafter, the fourth embodiment will be described.

As shown in FIG. 24, two sub-pixels in the lateral direction are taken as a single unit in the fourth embodiment. The two sub-pixels (a unit of a solid thick line in a rectangular shape in the drawing) are constituted with four segmented electrodes (P1, P2, P3, P4), and the display region is constituted with a combination of the four kinds of segmented electrode layout within the two sub-pixels. Further, the layout period of the pixel segmented electrodes within the two sub-pixels is a pitch of four sub-pixels in the X-direction and a pitch of two sub-pixels in the Y-direction. For the region where the neighboring segmented electrodes are the same, the segmented orientation of the same irradiation axis or the same polarization axis (both are combined in some cases) is employed. As shown in FIG. 25, the liquid crystal orientation is constituted with the four segmented orientations (O1, O2, O3, O4), each of which are substantially in a same shape and same area with the two sub-pixels. The segmented orientation layout period is a pitch of four sub-pixels in the X-direction and a pitch of four sub-pixels in the Y-direction. The regions surrounded by a broken line in FIG. 24 and FIG. 25 shows substantially the same regions. In FIG. 24, R, B, and G show the color filter colors (Red, Green, and Blue), respectively.

The combination of the segmented orientations in the case of FIG. 25 described above is completely the same pattern as the repeated period of the four segmented orientations (O1, O2, O3, O4) within the display region. Thus, it is possible to perform the four kinds of segmented orientation processing with a single mask. As an example, a segmented exposure mask that covers the segmented regions of the display region (work substrate) and an optical system of the photo-orientation processing whose irradiation axis or the polarization axis (both may be combined in some cases) can be determined arbitrarily are prepared. In a case where it is desired to execute the orientation processing by changing the phases of the four segmented orientations at rotation angles of 90 degrees (0, 90, 180, 270 degrees), segmented exposure may be performed by step feeding the work substrate by rotating it at each of the angles (0, 90, 180, 270 degrees) for the optical system of the photo-orientation processing.

(Supplementary Explanation)

While the present invention has been described above by referring to each of the embodiments, the present invention is not limited only to each of the embodiments described above. Various changes and modifications occurred to those skilled in the art can be applied to the structures and details of the present invention. For example, while the case where "m" in the scope of the appended claims is mainly "4" is shown in each of the embodiments, the present invention also includes the cases where "m" is "2", "3", or "5" or larger. Further, it is to be noted that the present invention includes the structures acquired by properly and mutually combining a part of or a whole part of the structures of each of the above-described embodiments.

Here, the effects of the present invention will be described in details.

The liquid crystal display device according to the present invention has a wide orientation pattern that covers the neighboring pixel regions when acquiring segmented orientations within the pixel by the photo-orientation processing. Thus, it is possible to maintain the wide viewing angle property even with high-definition pixels. As the segmented orientation, four-segmented orientation capable of providing symmetry of the orientation directions of the liquid crystal is particularly effective in order to improve the viewing angle properties of not only the top and bottom as well as left and right view fields but also the oblique view field.

Further, with the liquid crystal display device according to the present invention, the segment number of the segmented orientations can be reduced. Thus, the disclination region generated when the liquid crystal orientation by the segmented orientations becomes discontinuous can be decreased, so that deterioration in the display quality can be prevented even in a case of high definition. Since the layout of the segmented electrodes and the segmented orientations is changed periodically, display unevenness caused due to the electrode structure, the segmented orientations, and the like is not visually recognized continuously. Therefore, the display quality can be improved. The wide orientation pattern that covers the neighboring pixel regions is used, so that deterioration in the display quality for the spread of the proximity exposure and the aligning precision with the mask can be suppressed.

Further, with the liquid crystal display device according to the present invention, the segmented orientation processing can be performed efficiently. Especially, the segmented orientation processing of the present invention can share the mask used for each kind of the segmented orientation processing even for the four segmented orientations which are effective for improving the viewing angle properties of not only the top and bottom as well as left and right view fields but also the oblique view field. Further, through rotating the direction of the mask exposure to align the in-plane angle of the mask with respect to the work substrate with the four segmented orientations for acquiring the necessary orientation directions with respect to the work substrate, the manufacturing method capable of performing step exposure with a single photo-orientation device can be provided.

While a part of or a whole part of the above-described embodiments can be summarized as following Supplementary Notes, the present invention is not limited only to the following structures.

(Supplementary Note 1)

A liquid crystal display device which includes pixels arranged in matrix with an electrode pattern and a liquid crystal orientation region of a single pixel region being segmented and disposed, respectively, wherein:
the single pixel region has a mutually corresponding combination of the electrode pattern segmented into a plurality of segmented electrodes Pn (constituted with P1, P2, . . . , Pm, where m is an integer of 2 or larger) and a liquid crystal orientation segmented into a plurality of segmented orientations On (O1, O2, . . . , Om, where m is an integer of 2 or larger);
the segmented electrodes Pn (n is an arbitrary integer of 1 to m, and m is an integer of 2 or larger) of the single pixel region and segmented electrodes P'n (n is an arbitrary integer of 1 to m, and m is an integer of 2 or larger) of a pixel region adjacent thereto are in a same structure; and
the segmented orientations On (n is an arbitrary integer of 1 to m, and m is an integer of 2 or larger) of the single pixel region and segmented orientations O'n (n is an arbitrary integer of 1 to m, and m is an integer of 2 or larger) of at least one pixel adjacent thereto are formed with a same orientation region.

(Supplementary Note 2)

The liquid crystal display device as depicted in Supplementary Note 1, wherein
a segmented orientation region On+O'n formed with the segmented orientations On of the single pixel region and the segmented orientations O'n of the pixel region adjacent thereto is formed with a repeated pattern of a same shape and a same area, respectively.

(Supplementary Note 3)

A liquid crystal display device which includes pixels arranged in matrix with an electrode pattern and a liquid crystal orientation region of a single pixel region being segmented and disposed, respectively, wherein:
the pixel is constituted with a plurality of sub-pixels;
at least one or more of the sub-pixels are combined as a unit sub-pixel region;
the single unit sub-pixel region has a mutually corresponding combination of the electrode pattern segmented into a plurality of segmented electrodes Pn (constituted with P1, P2, . . . , Pm, where m is an integer of 2 or larger) and a liquid crystal orientation segmented into a plurality of segmented orientations On (O1, O2, . . . , Om, where m is an integer of 2 or larger);
the segmented electrodes Pn (n is an arbitrary integer of 1 to m, and m is an integer of 2 or larger) of the single unit sub-pixel region and segmented electrodes P'n (n is an arbitrary integer of 1 to m, and m is an integer of 2 or larger) of at least a single sub-pixel region adjacent thereto are in a same structure; and
the segmented orientations On (n is an arbitrary integer of 1 to m, and m is an integer of 2 or larger) of the single unit sub-pixel region and segmented orientations O'n (n is an arbitrary integer of 1 to m, and m is an integer of 2 or larger) of at least a single sub-pixel region adjacent thereto are formed with a same orientation region.

(Supplementary Note 4)

The liquid crystal display device as depicted in Supplementary Note 3, wherein
a segmented orientation region On+O'n formed with the segmented orientations On of the single unit sub-pixel region and the segmented orientations O'n of the sub-pixel region adjacent thereto is formed with a repeated pattern of a same shape and a same area, respectively.

The liquid crystal display device as depicted in any one of Supplementary Notes 1 to 4, wherein the liquid crystal orientation is a lateral electric field mode.
(Supplementary Note 6)
The liquid crystal display device as claimed in any one of Supplementary Notes 1 to 5, wherein the m is 4.
(Supplementary Note 7)
A method for producing a liquid crystal display device which includes pixels arranged in matrix with an electrode pattern and a liquid crystal orientation region of a single pixel region being segmented and disposed, respectively, wherein:
- the single pixel region has a mutually corresponding combination of the electrode pattern segmented into a plurality of segmented electrodes Pn (constituted with P1, P2, . . . , Pm, where m is an integer of 2 or larger) and a liquid crystal orientation segmented into a plurality of segmented orientations On (O1, O2, . . . , Om, where m is an integer of 2 or larger);
- the segmented electrodes Pn (n is an arbitrary integer of 1 to m, and m is an integer of 2 or larger) of the single pixel region and segmented electrodes P'n (n is an arbitrary integer of 1 to m, and m is an integer of 2 or larger) of a pixel region adjacent thereto are in a same structure;
- the segmented orientations On (n is an arbitrary integer of 1 to m, and m is an integer of 2 or larger) of the single pixel region and segmented orientations O'n (n is an arbitrary integer of 1 to m, and m is an integer of 2 or larger) of at least one pixel adjacent thereto are formed with a same orientation region;
- a segmented orientation region On+O'n formed with the segmented orientations On of the single pixel region and the segmented orientations O'n of the pixel region adjacent thereto is formed with a repeated pattern of a same shape and a same area, respectively; and
- the segmented orientation region On+O'n (n is an arbitrary integer of 1 to m, and m is an integer of 2 or larger) is formed by photo-orientation processing in which an arbitrary mask size is taken as an exposure area and step feed is performed in a direction corresponding to an orientation direction of each region of the orientation segment.

(Supplementary Note 8)
A method for producing a liquid crystal display device which includes pixels arranged in matrix with an electrode pattern and a liquid crystal orientation region of a single pixel region being segmented and disposed, respectively, wherein:
- the pixel is constituted with a plurality of sub-pixels;
- at least one or more of the sub-pixels are combined as a unit sub-pixel region;
- the single unit sub-pixel region has a mutually corresponding combination of the electrode pattern segmented into a plurality of segmented electrodes Pn (constituted with P1, P2, . . . , Pm, where m is an integer of 2 or larger) and a liquid crystal orientation segmented into a plurality of segmented orientations On (O1, O2, . . . , Om, where m is an integer of 2 or larger);
- the segmented electrodes Pn (n is an arbitrary integer of 1 to m, and m is an integer of 2 or larger) of the single unit sub-pixel region and segmented electrodes P'n (n is an arbitrary integer of 1 to m, and m is an integer of 2 or larger) of at least a single unit sub-pixel region adjacent thereto are in a same structure;
- the segmented orientations On (n is an arbitrary integer of 1 to m, and m is an integer of 2 or larger) of the single unit sub-pixel region and segmented orientations O'n (n is an arbitrary integer of 1 to m, and m is an integer of 2 or larger) of at least a single unit sub-pixel region adjacent thereto are formed with a same orientation region;
- a segmented orientation region On+O'n formed with the segmented orientations On of the single unit sub-pixel region and the segmented orientations O'n of the sub-pixel region adjacent thereto is formed with a repeated pattern of a same shape and a same area, respectively; and
- the segmented orientation region On+O'n is formed by photo-orientation processing in which an arbitrary mask size is taken as an exposure area and step feed is performed in a direction corresponding to an orientation direction of each region of the orientation segment.

(Supplementary Note 9)
The method for producing the liquid crystal display device as depicted in Supplementary Note 7 or 8, wherein one kind or two kinds of mask is used for the photo-orientation processing.
(Supplementary Note 10)
The method for producing the liquid crystal display device as claimed in any one of Supplementary Notes 7 to 9, wherein the m is 4.

INDUSTRIAL APPLICABILITY

The liquid crystal display device according to the present invention can be used as an arbitrary apparatus as a liquid crystal display that is required to have high uniformity on the display screen, high contrast, a finer color regenerability, and a wide viewing angle property. In particular, the liquid crystal display device can be utilized as an arbitrary apparatus that is loaded on a lateral electric field type active matrix liquid crystal display that is highly required for high-end use.

REFERENCE NUMERALS

P1, P2, P3, P4 Segmented electrode
O1, O2, O3, O4 Segmented orientation
11 TFT substrate
11a Polarization axis of TFT substrate
12 CF substrate
12a Polarization axis of CF substrate
13 Liquid crystal layer

The invention claimed is:
1. A liquid crystal display device, comprising pixels arranged in matrix with an electrode pattern and a liquid crystal orientation region of a single pixel region being segmented and disposed, respectively, wherein:
- the single pixel region has a mutually corresponding combination of the electrode pattern segmented into a plurality of segmented electrodes Pn (constituted with P1, P2, - - -, Pm, where m is an integer of 2 or larger) and a liquid crystal orientation segmented into a plurality of segmented orientations On (O1, O2, - - -, Om, where m is an integer of 2 or larger);
- the segmented electrodes Pn (n is an arbitrary integer of 1 to m, and m is an integer of 2 or larger) of the single pixel region and segmented electrodes P'n (n is an arbitrary integer of 1 to m, and m is an integer of 2 or larger) of a pixel region adjacent thereto are in a same structure; and
- the segmented orientations On (n is an arbitrary integer of 1 to m, and m is an integer of 2 or larger) of the single pixel region and segmented orientations O'n (n is an arbitrary integer of 1 to m, and m is an integer of 2 or larger) of at least one pixel adjacent thereto are formed with a same orientation region.

2. The liquid crystal display device as claimed in claim 1, wherein
a segmented orientation region On+O'n formed with the segmented orientations On of the single pixel region and the segmented orientations O'n of the pixel region adjacent thereto is formed with a repeated pattern of a same shape and a same area, respectively.

3. A liquid crystal display device, comprising pixels arranged in matrix with an electrode pattern and a liquid crystal orientation region of a single pixel region being segmented and disposed, respectively, wherein:
the pixel is constituted with a plurality of sub-pixels;
at least one or more of the sub-pixels are combined as a unit sub-pixel region;
the single unit sub-pixel region has a mutually corresponding combination of the electrode pattern segmented into a plurality of segmented electrodes Pn (constituted with P1, P2, - - - , Pm, where m is an integer of 2 or larger) and a liquid crystal orientation segmented into a plurality of segmented orientations On (O1, O2, - - - , Om, where m is an integer of 2 or larger);
the segmented electrodes Pn (n is an arbitrary integer of 1 to m, and m is an integer of 2 or larger) of the single unit sub-pixel region and segmented electrodes P'n (n is an arbitrary integer of 1 to m, and m is an integer of 2 or larger) of at least a single sub-pixel region adjacent thereto are in a same structure; and
the segmented orientations On (n is an arbitrary integer of 1 to m, and m is an integer of 2 or larger) of the single unit sub-pixel region and segmented orientations O'n (n is an arbitrary integer of 1 to m, and m is an integer of 2 or larger) of at least a single sub-pixel region adjacent thereto are formed with a same orientation region.

4. The liquid crystal display device as claimed in claim 3, wherein
a segmented orientation region On+O'n formed with the segmented orientations On of the single unit sub-pixel region and the segmented orientations O'n of the sub-pixel region adjacent thereto is formed with a repeated pattern of a same shape and a same area, respectively.

5. The liquid crystal display device as claimed in claim 1, wherein
the liquid crystal orientation is a lateral electric field mode.

6. The liquid crystal display device as claimed in claim 3, wherein
the liquid crystal orientation is a lateral electric field mode.

7. The liquid crystal display device as claimed in claim 1, wherein
the m is 4.

8. The liquid crystal display device as claimed in claim 3, wherein
the m is 4.

9. A method for producing a liquid crystal display device which comprises pixels arranged in matrix with an electrode pattern and a liquid crystal orientation region of a single pixel region being segmented and disposed, respectively, wherein:
the single pixel region has a mutually corresponding combination of the electrode pattern segmented into a plurality of segmented electrodes Pn (constituted with P1, P2, - - - , Pm, where m is an integer of 2 or larger) and a liquid crystal orientation segmented into a plurality of segmented orientations On (O1, O2, - - - , Om, where m is an integer of 2 or larger);
the segmented electrodes Pn (n is an arbitrary integer of 1 to m, and m is an integer of 2 or larger) of the single pixel region and segmented electrodes P'n (n is an arbitrary integer of 1 to m, and m is an integer of 2 or larger) of a pixel region adjacent thereto are in a same structure;
the segmented orientations On (n is an arbitrary integer of 1 to m, and m is an integer of 2 or larger) of the single pixel region and segmented orientations O'n (n is an arbitrary integer of 1 to m, and m is an integer of 2 or larger) of at least one pixel adjacent thereto are formed with a same orientation region;
a segmented orientation region On+O'n (n is an arbitrary integer of 1 to m, and m is an integer of 2 or larger) formed with the segmented orientations On of the single pixel region and the segmented orientations O'n of the pixel region adjacent thereto is formed with a repeated pattern of a same shape and a same area, respectively; and
the segmented orientation region On+O'n is formed by photo-orientation processing in which an arbitrary mask size is taken as an exposure area and step feed is performed in a direction corresponding to an orientation direction of each region of the orientation segment.

10. A method for producing a liquid crystal display device which comprises pixels arranged in matrix with an electrode pattern and a liquid crystal orientation region of a single pixel region being segmented and disposed, respectively, wherein:
the pixel is constituted with a plurality of sub-pixels;
at least one or more of the sub-pixels are combined as a unit sub-pixel region;
the single unit sub-pixel region has a mutually corresponding combination of the electrode pattern segmented into a plurality of segmented electrodes Pn (constituted with P1, P2, - - - , Pm, where m is an integer of 2 or larger) and a liquid crystal orientation segmented into a plurality of segmented orientations On (O1, O2, - - - , Om, where m is an integer of 2 or larger);
the segmented electrodes Pn (n is an arbitrary integer of 1 to m, and m is an integer of 2 or larger) of the single unit sub-pixel region and segmented electrodes P'n (n is an arbitrary integer of 1 to m, and m is an integer of 2 or larger) of at least a single unit sub-pixel region adjacent thereto are in a same structure;
the segmented orientations On (n is an arbitrary integer of 1 to m, and m is an integer of 2 or larger) of the single unit sub-pixel region and segmented orientations O'n (n is an arbitrary integer of 1 to m, and m is an integer of 2 or larger) of at least a single unit sub-pixel region adjacent thereto are formed with a same orientation region;
a segmented orientation region On+O'n (n is an arbitrary integer of 1 to m, and m is an integer of 2 or larger) formed with the segmented orientations On of the single sub-pixel region and the segmented orientations O'n of the sub-pixel region adjacent thereto is formed with a repeated pattern of a same shape and a same area, respectively; and
the segmented orientation region On+O'n is formed by photo-orientation processing in which an arbitrary mask size is taken as an exposure area and step feed is performed in a direction corresponding to an orientation direction of each region of the orientation segment.

11. The method for producing the liquid crystal display device as claimed in claim 9, wherein
one kind or two kinds of mask is used for the photo-orientation processing.

12. The method for producing the liquid crystal display device as claimed in claim 10, wherein
one kind or two kinds of mask is used for the photo-orientation processing.

13. The method for producing the liquid crystal display device as claimed in claim 9, wherein
the m is 4.

14. The method for producing the liquid crystal display device as claimed in claim 10, wherein
the m is 4.

* * * * *